United States Patent
Kracht

(10) Patent No.: US 6,516,345 B1
(45) Date of Patent: Feb. 4, 2003

(54) APPROACHES FOR DETERMINING ACTUAL PHYSICAL TOPOLOGY OF NETWORK BASED ON GATHERED CONFIGURATION INFORMATION REPRESENTING TRUE NEIGHBORING DEVICES

(75) Inventor: James E. Kracht, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/029,548

(22) Filed: Dec. 21, 2001

Related U.S. Application Data

(63) Continuation of application No. 09/302,531, filed on Apr. 30, 1999, now Pat. No. 6,377,987.

(51) Int. Cl.[7] .......................... G06F 15/77; G06F 15/16
(52) U.S. Cl. ..................... 709/220; 709/224; 709/228; 709/227; 709/249; 370/254
(58) Field of Search ................................. 709/220, 224, 709/228, 227, 249; 370/254

(56) References Cited

U.S. PATENT DOCUMENTS

| | | | | |
|---|---|---|---|---|
| 5,481,674 A | * | 1/1996 | Mahavadi | 370/255 |
| 5,684,959 A | * | 11/1997 | Bhat et al. | 370/258 |
| 5,706,440 A | | 1/1998 | Compliment et al. | 709/224 |
| 5,729,685 A | * | 3/1998 | Chatwani et al. | 370/254 |
| 5,793,975 A | * | 8/1998 | Zeldin | 709/224 |
| 5,796,736 A | | 8/1998 | Suzuki | 370/399 |
| 5,822,305 A | * | 10/1998 | Vaishnavi et al. | 370/252 |
| 5,845,149 A | | 12/1998 | Husted et al. | 710/9 |
| 6,069,894 A | * | 5/2000 | Holender et al. | 370/397 |
| 6,108,702 A | | 8/2000 | Wood | 709/224 |
| 6,131,119 A | * | 10/2000 | Fukui | 709/224 |
| 6,205,122 B1 | | 3/2001 | Sharon et al. | 370/254 |
| 6,286,038 B1 | * | 9/2001 | Reichmeyer et al. | 709/220 |

* cited by examiner

Primary Examiner—Krisna Lim
(74) Attorney, Agent, or Firm—Craig G. Holmes; Hickman Palermo Truong & Becker LLP

(57) ABSTRACT

Approaches for determining the actual physical topology of network devices in a network are disclosed. To determine a physical topology, a discovery mechanism determines a set of network addresses for identifying devices within a network. Based on the set of network addresses, the discovery mechanism identifies a group of devices that are associated with the network. Layer 2 and Layer 3 configuration information is gathered from the group of devices to identify possible neighboring devices within the network. The configuration information is then processed to generate topology information that identifies true neighboring devices and the actual links that exist between each of the neighboring devices. The approaches eliminate misleading information and prevent generation of incorrect topologies.

48 Claims, 14 Drawing Sheets

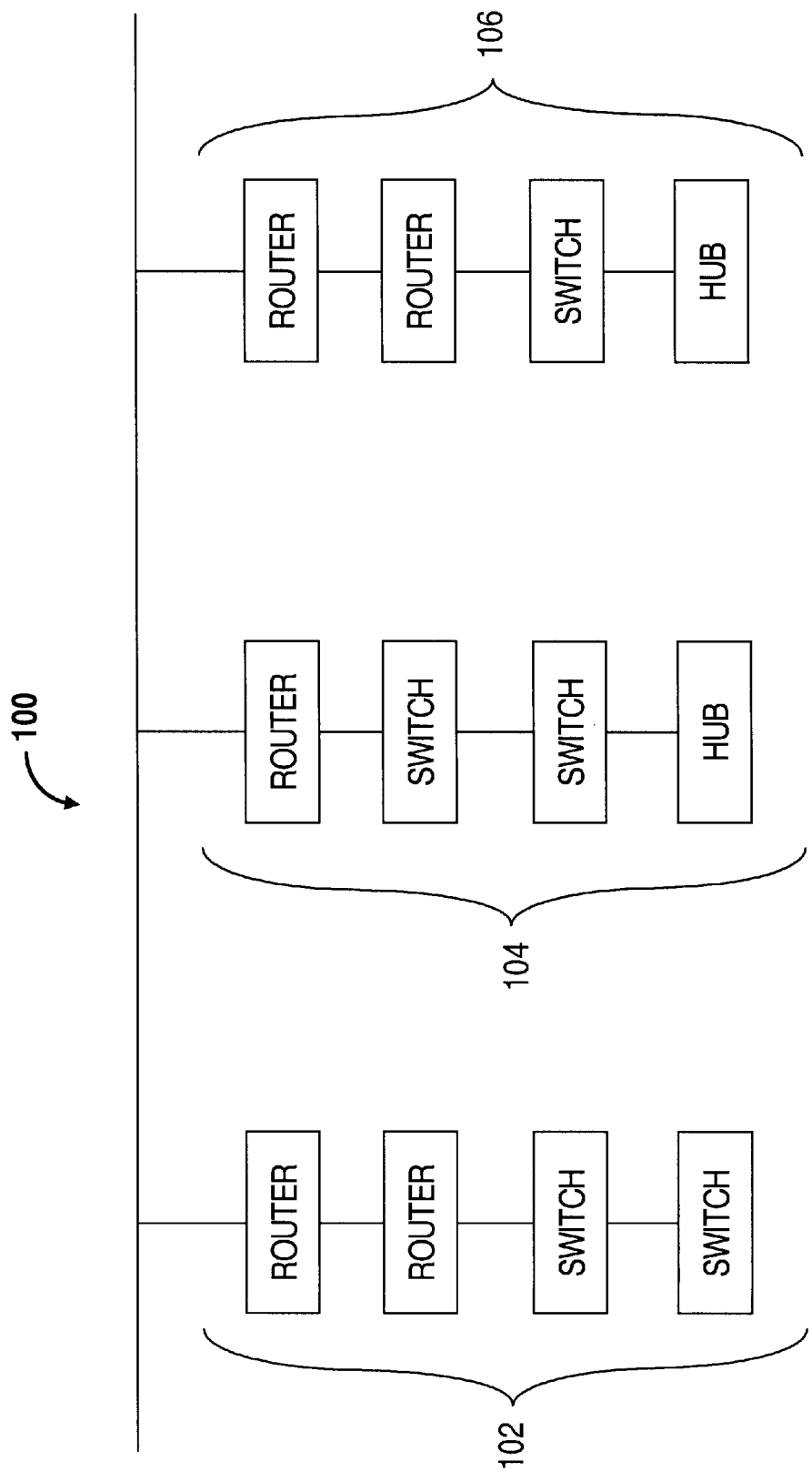

APPROACHES FOR DETERMINING ACTUAL PHYSICAL TOPOLOGY OF NETWORK BASED ON GATHERED CONFIGURATION INFORMATION REPRESENTING TRUE NEIGHBORING DEVICES

RELATED APPLICATION; CLAIM OF PRIORITY

This application claims domestic priority as a continuation application from prior U.S. non-provisional application Ser. No. 09/302,531, filed Apr. 30, 1999, now U.S. Pat. No. 6,377,987B1, the entire disclosure of which is hereby incorporated by reference for all purposes as if fully set forth herein.

FIELD OF THE INVENTION

The present invention generally relates to the management of network systems, and more specifically to determining a physical topology of network devices in a network.

BACKGROUND OF THE INVENTION

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Network devices ordinarily operate on a continuous basis. Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device.

Many networks are managed, supervised and maintained by a network administrator or network manager. To properly maintain a network, the network administrator needs to have up-to-date information available about the devices in the network and how the devices are interconnected. The OSI network reference model is useful in classifying network management information. Information about what devices are in the network is generally called Layer 3 information, and information about how the devices are physically connected within the network is called Layer 2 information. In combination, this information may be used to by the network administrator to understand the physical topology of the network. The topology is a mapping that indicates the type of devices that are currently included in the network and how the interfaces of these devices are physically linked.

In addition, as an enterprise grows, a network administrator may be required to add new devices to a network or to upgrade devices in the network. To determine how and where to add or upgrade a particular device, the administrator needs to have a clear understanding of the topology of the network.

Different types of network management systems, such as OpenView, commercially available from Hewlett Packard Company of Palo Alto, Calif., may be used to identify the devices that are contained in a particular network in a limited way. In the past, constructing a network topology using automatic methods or means has been awkward or produces incomplete or inaccurate information.

For example, FIG. 1 illustrates an example of the type of graphical display of a network topology that may be produced on a computer display using a network management software program such as OpenView. In this example, graphical view 100 includes a graphical display of devices contained in three (3) separate networks 102, 104, 106, based only on Layer 3 information that has been acquired from the networks. Thus, based on the graphical view 100, the network administrator can identify which devices are connected to which networks.

However, a drawback with this type of network management system is that it shows logical connections of network devices, but not physical connection information. It logically identifies to which network a particular device is linked, based on Layer 3 information, but it does not indicate how individual devices are physically linked together, based on Layer 2 information. Thus, an administrator cannot determine the actual interface links or physical connectivity of each of the devices. This information may be critical in determining how the network can be expanded or upgraded, or in troubleshooting.

Although FIG. 1 illustrates a simple network environment, large enterprises may have thousands of network devices. In a large enterprise network, the foregoing problems become acute.

To address these problems, certain proprietary discovery protocols have been developed to help identify how the interfaces of each device is physically linked within a network, based on Layer 2 information. For example, the Cisco Discovery Protocol ("CDP"), which is used in products that are commercially available from Cisco Systems, Inc., is a low-level communication protocol that can help identify how devices are linked in a network. When a device supporting CDP sends a message to another device, the message includes a packet that contains its IP address and an interface descriptor. The interface descriptor represents the logical name of the port from which the message was sent. If the receiving device also supports CDP, the information is recorded at the receiving device and in certain cases may be used to determine how two devices are physically connected.

FIG. 2A illustrates a network 200 that includes devices 202 and 204, each supporting CDP. As illustrated, device 202 includes IP address 206, a CDP record 210 and ports 214, 216. Respectively associated with port 214 and port 216 are logical names 224, 228. Device 204 includes IP address 208, a CDP record 212 and ports 218, 220, 222. Respectively associated with ports 218, 220, 222 are logical names 232, 236, 240.

When a message is sent from device 202 to device 204, device 202 includes a packet of information that contains both its IP address 206 and the logical name of the port that is used to send the message. Upon receiving the message information, device 204 records, in CDP record 212, which port received the message and the IP address and logical name in the information packet. In this case, these values include port "FA0:3" and IP address "172.20.142.147". Thus, by querying device 204 for the information in CDP record 212, a network management system can conclude that port 220 is physically connected to a logical port "FA0:3" of a device having IP address "172.20.142.147". In addition, by querying the device associated with IP address "172.20.142.147", the management system can conclude that device 202 is configured such that logical name 224 is associated with port 214 and thus port 214 of device 202 is physically linked to port 220 of device 204.

However, a drawback with this approach is that certain devices may not support the discovery protocol. For example, a network may include low-end devices or non-Cisco devices that do not support CDP ("non-CDP devices"). When a device does not support CDP and receives CDP information, generally it forwards the CDP information on to the next device. Thus, a network management system that relies on CDP for determining physical links of a managed network cannot identify physical links to non-CDP devices.

FIG. 2B illustrates a network 220 that includes devices 202, 204, 250. Device 250 includes IP address 268 and ports 264, 266 that are respectively associated with logical names 254, 258. Assume that device 250 does not support CDP. When a message is sent from device 202 to device 204, device 202 sends a packet of information that contains both its IP address 206 and the logical name 224 of port 214 that is used to send the message. Upon receiving the packet, instead of recording the CDP information and generating a packet based on the port that is used to communicate with device 204, device 250 forwards the packet to device 204. In response to receiving that packet, device 204 stores information in CDP record 212 that indicates that port 220 is physically connected to a logical port "FA0:3" of a device having IP address "172.20.142.147". If the network management system queries device 204, it will incorrectly determine that port 220 of device 204 is physically connected to port 214 of device 202.

In addition, many networks include one or more hubs or repeaters that allow multiple devices to be connected within the network. A hub is a shared segment device. Accordingly, even if a hub supports a discovery protocol such as CDP, it will include both the CDP packet information it receives from a sending device and the CDP packet information that it generates when forwarding the message to the receiving device. Thus, as shown by CDP record 212 of FIG. 2C, the receiving device will record incorrectly that it is physically connected to multiple devices on the same port.

Based on the foregoing, there is a clear need for a mechanism that can accurately identify the particular type of devices that are included in a network based on Layer 3 information.

There is also is a clear need for a mechanism that can accurately and completely identify the physical connectivity of devices in a network based on Layer 2 information.

It is also desirable to have a mechanism that can identify the particular type of devices that are included in a network, and that can generate a graphical display of the physical topology of the network based on the Layer 2 and Layer 3 information.

SUMMARY OF THE INVENTION

The foregoing needs, and other needs and objects that will become apparent from the following description, are achieved in the present invention, which comprises, in one aspect, a method for determining a physical topology of a network, comprising the computer-implemented steps of discovering a plurality of devices that are located in the network based on each address within a set of network addresses and creating and storing information representing the plurality of devices; determining possible neighboring devices for each device in the plurality of devices; processing the configuration information to eliminate, from among the possible neighboring devices, each device that is not actually a neighbor of the plurality of devices to create information representing true neighboring devices and each link between them; and creating and storing information that represents the topology based on the information representing the plurality of devices and the information representing the true neighboring devices and each link.

One feature involves eliminating, from among the information representing the plurality of devices, information associated with each device that is incorrectly identified as a known device. Another feature involves receiving Layer 2 and Layer 3 configuration information from each device in the plurality of devices. Still another feature relates to determining possible neighboring devices includes the step of sending the information requests to collect Layer 2 and Layer 3 configuration information from the plurality of devices. A related feature is that the configuration information identifies what network addresses are received on what ports of each device among the plurality of devices.

According to another feature, the method features receiving one or more ranges of network addresses. In a related feature, one or more ranges of IP addresses are received; the ranges of IP addresses are associated with IP addresses that correspond to one or more local area networks.

Another feature involves attempting to contact a device at each address within the set of network addresses. A related feature is that the step of attempting to contact a device comprises pinging each address within the set of network addresses.

In another feature, the step of discovering involves dividing the set of network addresses into a plurality of network address subgroups; assigning separate processes to each of the plurality of network address subgroups; and executing each of the assigned processes in parallel to determine whether a device is associated with each address within a network address subgroup. A related feature involves, in response to contacting a particular device at a particular address, contacting a Simple Network Management Protocol (SNMP) agent in the particular device to receive a device type value is associated with the particular device. Another related feature is that contacting an SNMP agent comprises requesting identification information from the SNMP agent in the device; comparing the identification information to a list of known device data; and based on the comparison, determining whether the device is of a known device type.

According to yet another feature, the method involves determining service layers for which the device operates when the device is not of a known device type. Based on the service layers that are determined, the method infers that the device is of a particular device type associated with the service layers. In another feature, the step of processing the configuration information comprises the steps of identifying devices within the plurality of devices that are not an actual device associated with the set of network addresses, and bypassing the configuration information that is based on devices within the plurality of devices that are not actual devices associated with the set of network addresses.

In still another feature, processing the configuration information further comprises identifying three or more potentially neighboring devices that have a single port that appears to be physically linked to multiple neighboring devices, and using the configuration information to determine that the single port is actually physically linked to one or more unidentifiable devices that are in the network but are not among the plurality of devices. Processing the configuration information may also involve identifying an apparent physical link between a first port of a first potentially neighboring device and a second port of a second potentially neighboring device, wherein the Media Access Control (MAC) address associated with the first port is observed at the second port and the MAC address associated with the second port is observed at the first port; determining that a common MAC address is observed by both the first port and the second port; and based on the common MAC address, determining that the first port of the first potentially neighboring device and the second port of the second potentially neighboring device are actually physically linked to one or more unidentifiable devices that are part of the network but are not included among the plurality of devices.

The invention also encompasses a computer-readable medium, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating a network topology generated by certain conventional network management systems;

DETAILED DESCRIPTION OF THE PREFERRED EMBODIMENT

Figure 2A:
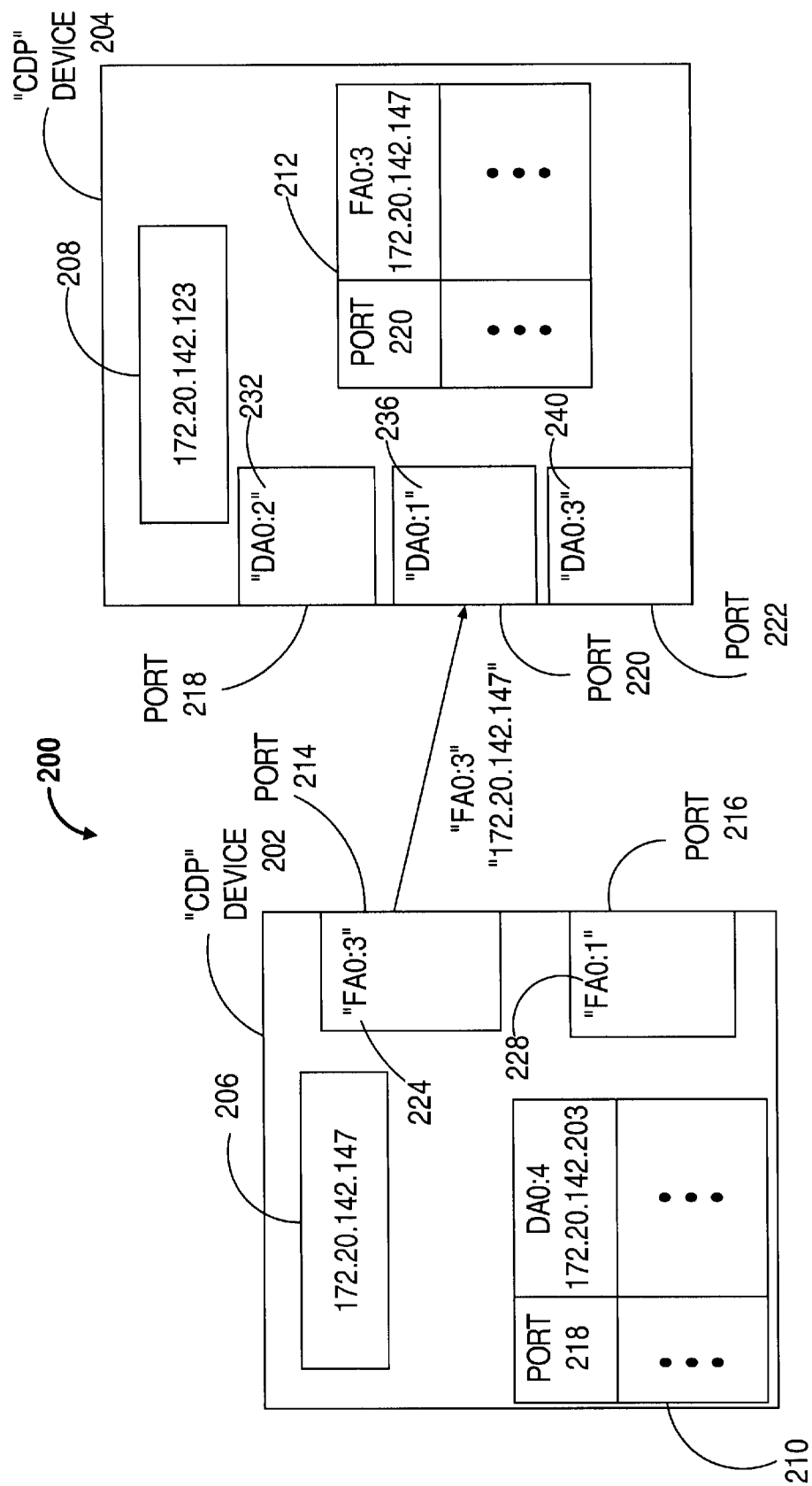
FIG. 2A is a block diagram illustrating a network of devices that support a device discovery protocol using Layer 2 information.
Figure 2B:
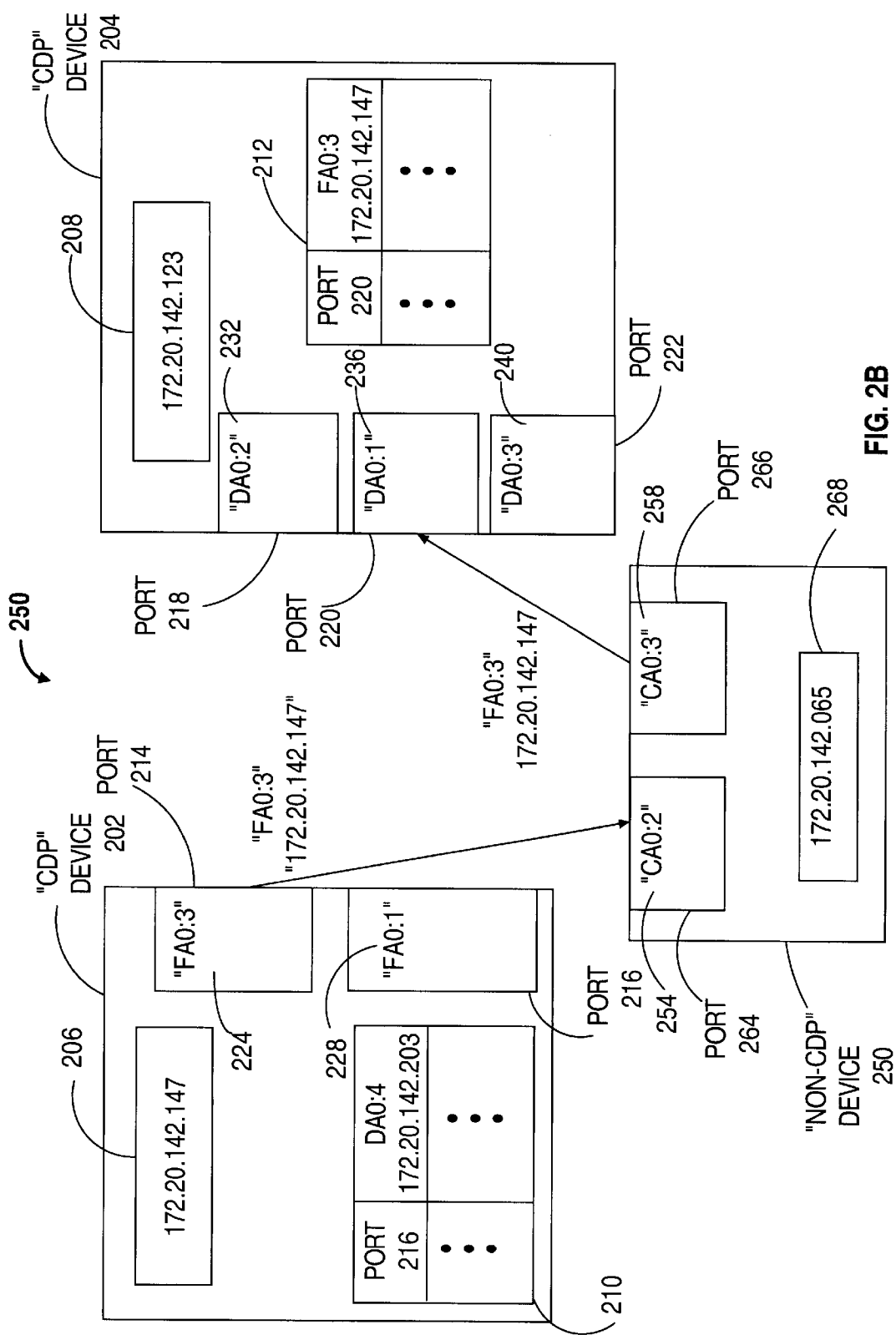
FIG. 2B is a block diagram illustrating use of the network, devices, and protocol of FIG. 2A.
Figure 2C:
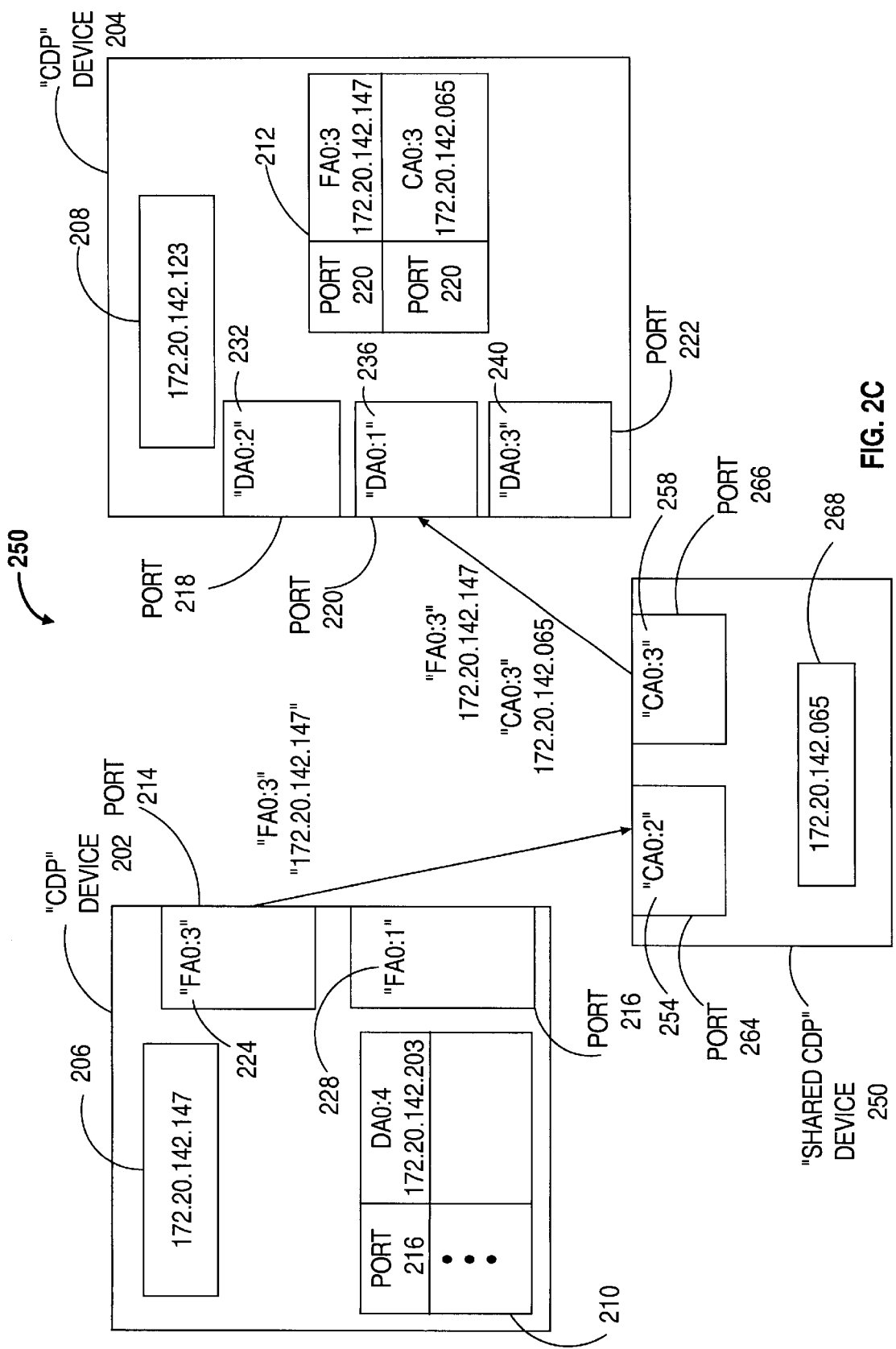
FIG. 2C is another block diagram illustrating further use of the network, devices and protocol of FIG. 2A.

A method and apparatus for discovering and determining the physical topology of network devices in a network are disclosed.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Operational Context

A discovery mechanism is provided for determining the physical topology of network devices in a network. In one embodiment, the discovery mechanism determines a set of network addresses for identifying devices within a network. The discovery mechanism then identifies a group of devices that are associated with the network address.

Layer 2 and Layer 3 configuration information is gathered from the group of devices. The configuration information is then processed to identify the neighboring devices of each device within the network. In this context, neighboring devices are two devices whose interfaces are physically and directly linked to one another.

The process of determining the physical topology is described in various phases. The various phases include a "device search" phase, an information gathering" phase and a "link processing" phase. Each phase represents a set of operations that is used to perform a particular function.

DEVICE SEARCH PHASE

1. DETERMINING ADDRESS RANGES.

In one embodiment, the discovery mechanism receives user input that defines a set of network addresses. In a preferred embodiment, the network addresses represent IP addresses that fall within the address range of one or more networks. For example, a network administrator typically knows or can determine the range of IP addresses that have been allocated for a particular network. By receiving an upper bound IP address and a lower bound IP address, the discovery mechanism identifies a range of IP addresses that is to be searched for identifying devices within the network.

In certain embodiments, the discovery mechanism may control the maximum number of addresses that can be requested by a user. For example, the discovery mechanism may limit the range of addresses that a user may enter to a maximum of "1024" addresses. By limiting the number of addresses that may be requested, the discovery mechanism may control the total processing time that is required for determining a physical topology of network devices in a network.

In addition to the range of addresses, the user may also supply one or more Simple Network Management Protocol ("SNMP") community strings that are to be used when contacting the SNMP agent of each device. The SNMP community strings represent a type of password that is used by the SNMP agent of each device to control if and how the information associated with a particular device can be accessed. For example, providing a "read" community string to the SNMP agent of a device will only allow the device's information to be read by the requesting processes. Alternatively, providing a "write" community string to the SNMP agent of a device will allow the requesting process to not only read but also update the device's information.

In certain embodiments, if an SNMP community string is not supplied, the discovery mechanism uses a default SNMP community string when communicating with the agents of each device. For example, the SNMP community string "public" may be used as a default community string when one is not supplied. However, other default community strings may be used to contact a particular device's agent as embodiments of the invention are not limited any particular SNMP community string.

2. IDENTIFYING ADDRESSES THAT ARE ASSOCIATED WITH DEVICES.

Once the set of network addresses are identified, the discovery mechanism then determines which of the network addresses are associated with a device. In one embodiment, the set of addresses are divided into contiguous subsets of addresses, with each set preferably having approximately the same number of addresses. After dividing the set of addresses into multiple subsets, the discovery mechanism assigns each subset to a particular thread or process. The multiple threads may execute in parallel to detect whether a device has been assigned to a particular address within the set of addresses.

In one embodiment, to detect whether a device is associated with a network address, each thread attempts to communicate with a device at each address to which it is assigned. In certain embodiments, the Internet Control Message Protocol ("ICMP") is used by each thread to determine whether a device is potentially associated with an assigned address. For example, using ICMP, each thread may "ping" each address it has been assigned. If no response is received to the "ping", the thread continues to the next address that it has been assigned. However, if a reply is received, the thread identifies the particular addresses as potentially associated with a device.

3. IDENTIFYING DEVICE TYPES.

When a thread identifies an address as potentially associated with a device, an identification process is performed in which the thread attempts to identify the type of device that is associated with the network address (router, switch, hub, etc.). In certain embodiments, to determine the type of device, the thread attempts to contact the SNMP agent at the identified address to request the agent to return certain identification information to the thread.

In one embodiment, the information requested by a thread includes Management Information Base ("MIB") information about the particular device. For example, the information requested by a thread may include the MIB variable sysObjectID. The MIB variable sysObjectID identifies the particular type of device that is associated with the network address. A description of SNMP, MIBs and the type of MIB information that may supported by a device is described in Downes et al., "Internetworking Technologies Handbook" (Indianapolis, IN: Macmillan Technical Publishing, 1998), Chapter 52.

If no reply is received after sending the SNMP request, the thread continues to the next address that it has been assigned to determine whether it is potentially associated with a device.

However, if the SNMP agent responds to the SNMP request, the thread then attempts to identify the type of device based on the returned MIB information. For example, the MIB variable sysObjectID may identify a device by name, type, or model number.

In certain embodiments, to identify the device type, the returned sysObjectiD variable is compared to a set of known sysObjectID values in an attempt to identify the particular device type. In one embodiment, the discovery mechanism has a data file that correlates sysObjectID variables with a set of known device types. By comparing the returned sysObjectID variable to the entries within the data file, the thread can quickly determine if the device type can be identified. In addition, if the data file is updated as new types of devices are added to the network, the discovery mechanism can identify these new device types when they are added to the network.

In certain embodiments, when a device type cannot be identified, an additional attempt is made to determine the type of device. For example, the prefix of the sysObjectID variable may be used to determine whether the device is a "Cisco" device. If so, then the discovery mechanism uses the MIB sysServices value to identify the service layers at which the device operates; this enables the discovery mechanism to make an educated guess of the device type. For example, based on the service layer at which a device operates, the discovery mechanism may identify a device as a "generic" hub, router or switch.

The sysServices value generally includes a bit vector that having one bit associated with each layer of services in the seven-layer OSI networking model. Each layer in the OSI model, and therefore each bit, represents a service layer at which a device may potentially operate. Because different device types operate at different layers, by determining what bits are set in the bit vector, the discovery mechanism can make an educated guess as to the device type.

Figure 3:
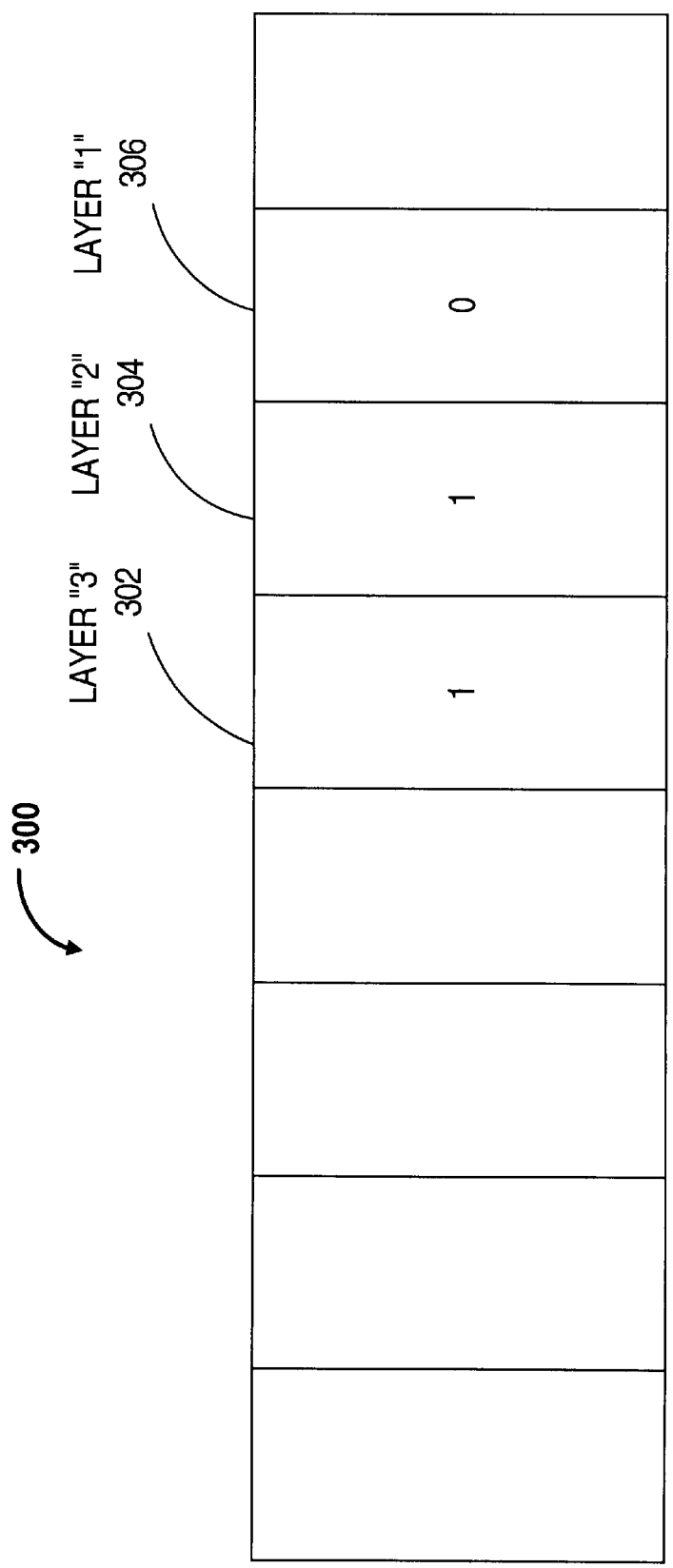
FIG. 3 is a block diagram illustrating a mechanism for determining the type of device that is connected to a network.

FIG. 3 illustrates a bit vector 300 that includes one or more bits 302, 304, 306 which respectively correspond to service layers "3", "2" and "1". The value of each bit 302, 304, 306 indicates whether the device may operate at the corresponding layer. The discovery mechanism may also guess a device type based on information that indicates the highest service level at which a device can physically operate. Table 1 is an example of such information.

TABLE 1

| DEVICE | HIGHEST POSSIBLE SERVICE LAYER |
|---|---|
| ROUTER | 3 |
| SWITCH | 2 |
| HUB | 1 |

In certain cases a particular device may be capable of operating at multiple service layers or at additional, higher service layers. For example, a router may be capable of operating at both service layer 2 and service layer 3. Thus, to identify the device type, the discovery mechanism first determines whether bit 302 is set. If so, then the discovery mechanism identifies the device as a router. However, if bit 302 is not set, the discovery mechanism next determines whether bit 304 is set. If so, then the discovery mechanism identifies the device as a switch. If both bit 302 and bit 304 are not set, the discovery mechanism determines whether bit 306 is set. If so, then the discovery mechanism identifies the device as a hub.

If the type of device can be identified, the discovery mechanism may instantiate an object matching the device type for storing the information that is obtained for the device. In one embodiment, a class of C++ objects that is derived from a base device class stores configuration information about each identified device (router, switch, hub). For example, if a device is identified as a router, then a router object is instantiated and stores information relevant to a router device. Similarly, if a device is a switch, then a switch object is instantiated and stores information that is relevant to a switch device.

INFORMATION GATHERING PHASE

1. GATHERING INFORMATION THAT IS COMMON ACROSS ALL KNOWN DEVICES

Once a device type is identified, the discovery mechanism gathers additional configuration information from the device. In certain embodiments, as additional information is received, the information is recorded within the particular object that was instantiated for the device. In this document, devices whose type is identified in the device search phase will be referred to as "known" devices.

In one embodiment, for each known device, the discovery mechanism sends SNMP requests to the device's SNMP agent to obtain all the configuration information that is commonly maintained by all known devices. The commonly requested configuration information may include the identity of the IP addresses and the interfaces that are associated with each known device. This additional information is used to better understand the actual configuration of each known device and how it is physically linked to other devices within the network.

For example, a router device may have multiple IP addresses. If the discovery mechanism mistakenly identifies two or more of the router's IP addresses as being associated with separate known devices, the retrieved IP address information can be used to correctly determine that the router's IP addresses are associated with a single known device. Also, if the initial set of network addresses did not include all of the IP addresses that are associated with a particular known device, the configuration information may be used to identify the missing IP address.

In addition, in certain cases, the initial range of addresses may include a broadcast address or an address that has been assigned to the network itself ("assigned network address"). In certain cases, the assigned network address may cause the discovery mechanism to erroneously identify the network itself as a known device during the device search phase. However, by gathering additional configuration information from each known device, the discovery mechanism can identify those addresses that do not actually correspond to actual devices.

For example, sending an SNMP request using a broadcast address causes the request to be sent to all devices within the network. Therefore, although a particular device has not actually been assigned the IP address, a device may respond to the request in a way that is misleading. However, by comparing the IP address that was sent with the SNMP request to those IP addresses that are associated with the responding device, the discovery mechanism can determine that network address is not associated with a known device.

As indicated above, the commonly requested configuration information also includes the identity of interfaces that are associated with each known device. The discovery mechanism may query each known device for each Media Access Control (MAC) address associated with each interface of each known device. A MAC address is a unique hardware identifier associated with a particular hardware component, such as a port or interface card, and generally comprises six (6) pairs of hexadecimal digits.

Figure 4:
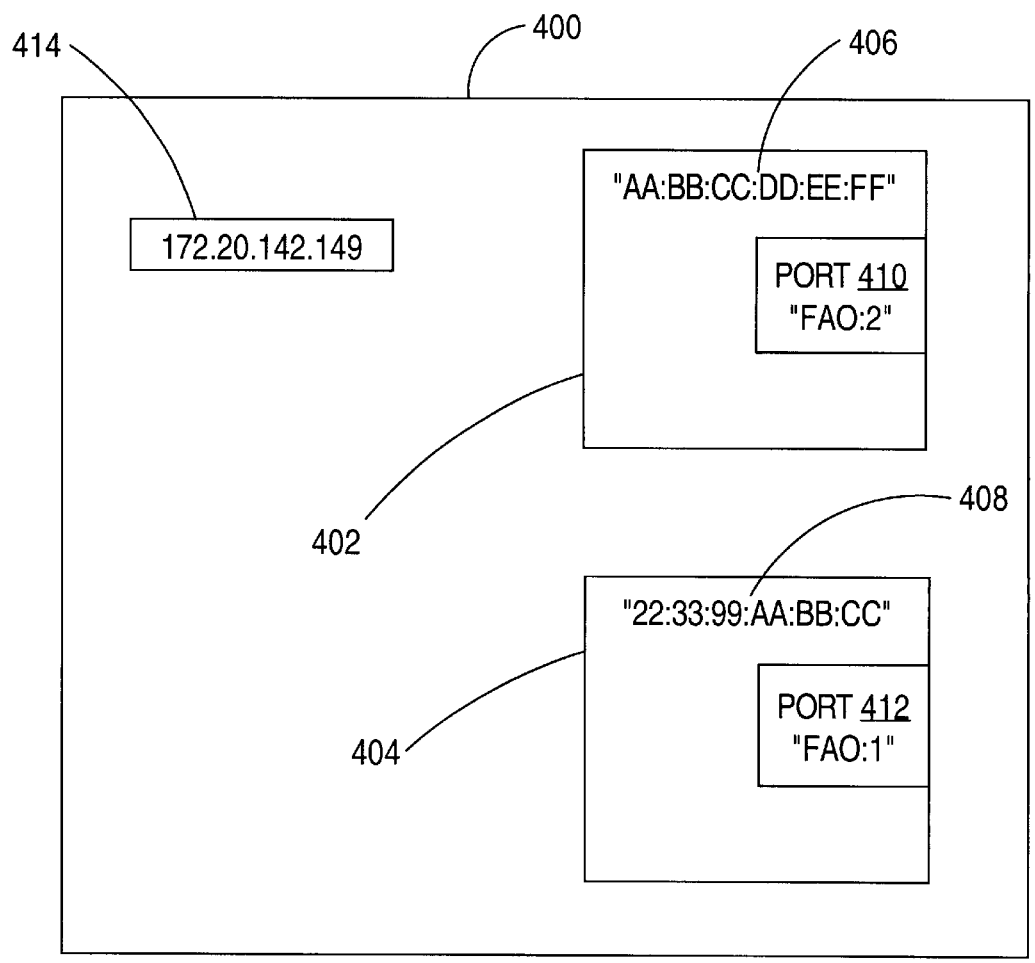
FIG. 4 is a block diagram illustrating the type of information that is associated with a network device.

FIG. 4 illustrates a device 400 that includes interfaces 402, 404 and is associated with an IP address 414. Interface 402 has a MAC address 406 and includes a port 410 having a logical port name "FA0:2". Similarly, interface 404 has a MAC address 408 and includes a port 412 having a port name "FA0:1". Whenever a message is sent from a source device to a destination device, within the message header, the source device includes its IP address and the MAC address of the interface from which the message is sent. Upon receiving the message, the destination site can identify the device that sent the message and the interface from which the message was sent. As discussed below, the IP and MAC address information in the header may be used to determine the topology of the network.

2. GATHERING PROPRIETARY DISCOVERY PROTOCOL INFORMATION

In certain embodiments, some or all of the known devices may support a particular proprietary discovery protocol. The discovery mechanism may take advantage of this by retrieving additional proprietary discovery information that is stored by known devices.

For example, for those known devices that support CDP, the discovery mechanism may retrieve corresponding CDP information. Devices that support CDP maintain a mapping of the logical interfaces and IP addresses that are seen by each port. As shown in FIG. 2A, the CDP information may indicate what logical port names and IP addresses are physically connected to the different device ports. Thus, CDP information can be used as a starting point for determining the actual topology of the network.

3. GATHERING INFORMATION THAT IS SPECIFIC TO THE TYPE OF KNOWN DEVICE

In certain embodiments, the discovery mechanism requests additional configuration information that is specific to each type of each known device. In particular, the specific configuration information identifies what IP and MAC addresses are seen on what interfaces of each known device.

For example, when a router receives a message, the router reads the IP and MAC address header information associated with the message. The router device then records, in its address translation table, the IP and MAC address information and the interface that was used to receive the message.

In one embodiment, the discovery mechanism queries each known device that is of type "router" to obtain its address translation information. This may be done by sending an SNMP request to the device's agent to obtain address translation information that is maintained by the particular router.

In a similar manner, for each known device that is a switch, the discovery mechanism sends SNMP requests to the device's agent to obtain its bridge table information, which may include its bridge port index and MAC address information, and which is maintained by the particular switching device. In one embodiment, the bridge port index can be used to identify what MAC addresses are seen by each interface of the switching device.

Likewise, for each hub, the discovery mechanism sends SNMP requests to the device's agent to obtain its repeater address tracking records, in the form of repeater port and MAC address information. In one embodiment, the repeater address tracking records indicate what MAC addresses each port of the hub device sees. For certain hubs, the repeater address tracking records may only reflect the last MAC address that was seen by the hub. Thus, to retrieve all MAC address information that is seen by a hub, the repeater address tracking records of each hub device may be read several times. By repeatedly reading the repeater address tracking records, the discovery mechanism can determine what MAC addresses each known hub sees.

4. REFRESHING LEARNED INFORMATION

For some devices, such as switches and hubs, certain configuration information is maintained on a cached basis. That is, currently stored information depends on what MAC addresses have been received recently on what interfaces of the particular device. Over a certain period of time, the "learned" MAC address information may be cached out if a message containing the MAC address information is not received by the device within that time.

Therefore, in certain embodiments, the discovery mechanism may cause messages to be continually sent between the different devices during the information-gathering phase. By causing messages to be continually sent between the different devices, a device's cache is more likely to contain a complete description of what MAC addresses may be received at each of its interfaces. The discovery mechanism causes messages to be continually sent between the different devices by continually pinging the set of network addresses. The discovery mechanism may spawn additional threads that refresh the configuration information of the known devices by repeatedly pinging the set of network addresses.

LINK PROCESSING PHASE

1. DISCARDING FALSE KNOWN DEVICE INFORMATION

After completing the information-gathering phase, the discovery mechanism enters a link processing phase in which the discovery mechanism discards any incorrect or false information that it has previously collected during the device search and information gathering phases. For example, configuration information that was collected based on a device responding to a network or broadcast address may be discarded, because these devices will have been discovered under their real IP addresses. Also, duplicate configuration information that was collected for devices having multiple IP addresses, such as routers, may be discarded as these generally will have been discovered multiple times.

2. PROCESSING PROPRIETARY DISCOVERY INFORMATION

After discarding the false information, the discovery mechanism processes any proprietary discovery information that it may have retrieved from the known devices. For example, CDP information may have been retrieved. The CDP information is processed by comparing the CDP records of different known devices to identify potentially neighboring devices. A pair of devices are considered neighboring devices if they are directly linked to one another.

For example, the CDP information for device A may indicate that port "7" is physically connected to logical port name "FA01" of a device associated with IP address "172.20.142.233". By determining that device B is associated with IP address "172.20.142.233" and that its logical port name "FA01" is associated with port "2", the discovery mechanism can determine that port "7" of device A is potentially physically inked to port "2" of device B. Accordingly, device A and device B are considered potential neighboring devices.

3. PROCESSING ROUTER TABLE INFORMATION

In one embodiment, potential neighboring devices that are not identified by the CDP information can be inferred by examining the routing tables of the known devices of type router. For example, if a router is connected to another router over a Wide Area Network (WAN) interface, then the routing table may have entries which show that for devices which are reached across that interface, the "next hop" in the route is given by the specific IP address of the other router. If this other router has also been discovered and has reciprocal information, the algorithm may conclude that the two are connected via that WAN interface.

4. IDENTIFYING INCORRECT POTENTIAL NEIGHBORING DEVICE INFERENCES.

Proprietary discovery protocols, such as CDP, may provide incorrect connectivity information. For example, as previously illustrated, a non-CDP device that is connected between two CDP devices will be invisible with respect to recorded CDP information. Similarly, shared segments, such as hub or repeater interfaces, report all CDP devices on those segments as neighboring devices. Thus, known devices supporting CDP that are connected through a hub will be identified as having multiple neighbors on the port that is connected to the hub.

In certain embodiments, the discovery mechanism identifies known devices that may produce inaccurate CDP information ("potential problem device"). For example, as indicated above, hub devices and devices that do not support CDP may cause inaccurate CDP information to be generated. In one embodiment, upon identifying a potential problem device, the MAC address information that was collected for the potential problem device is used to identify the potential neighboring devices that are not actually neighbors and to further refine the physical links that have been identified.

Figure 5A:
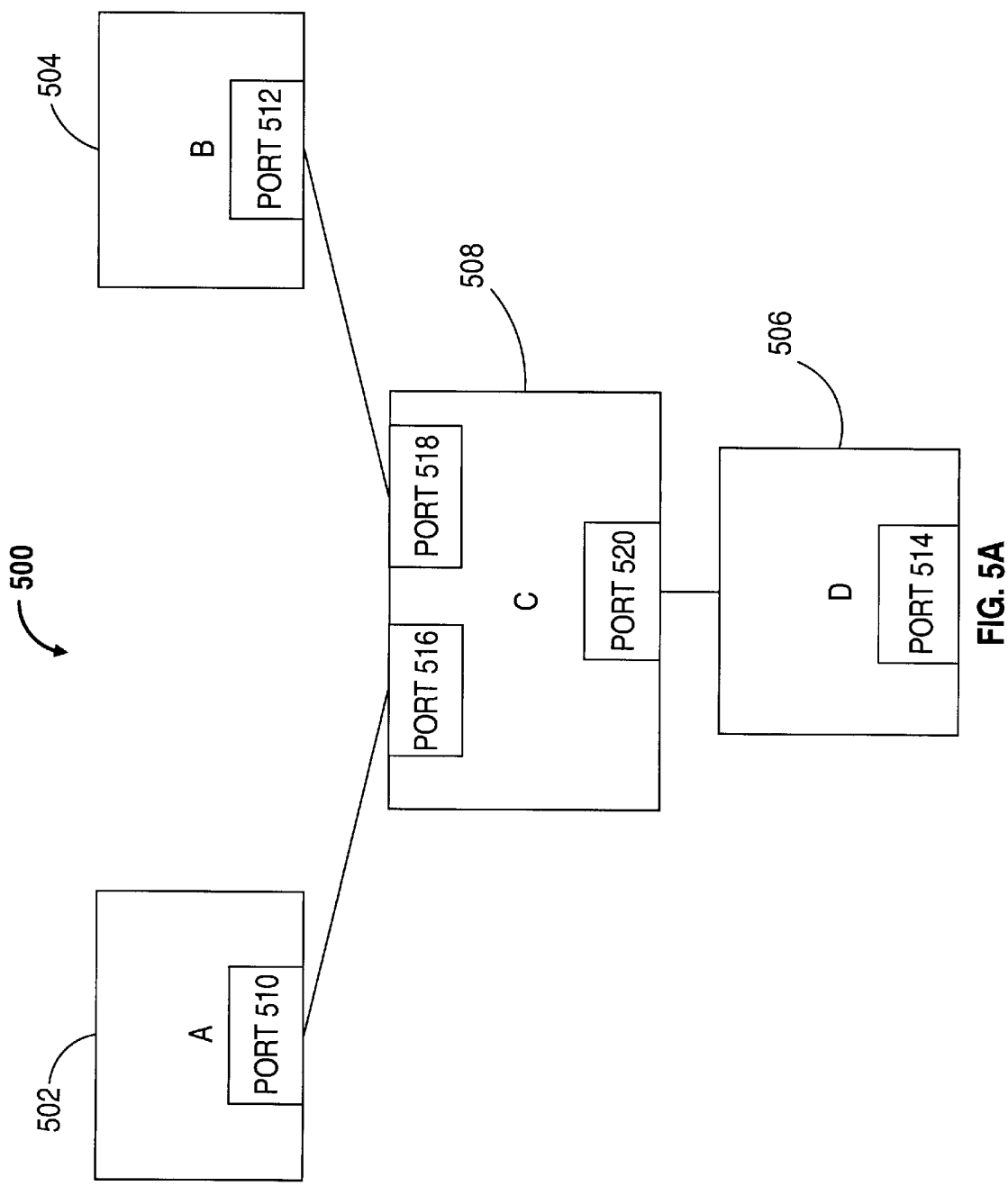
FIG. 5A is a block diagram illustrating how neighboring devices are connected.

For example, FIG. 5A depicts a network 500 that includes three devices 502, 504, 506 that support CDP and a switching device or hub device 508 that does not support CDP. In this example, devices 502–508 are depicted as they are actually physically linked; devices 502, 508 are neighboring devices, devices 504, 508 are neighboring devices, and devices 506, 508 are neighboring devices.

Figure 5B:
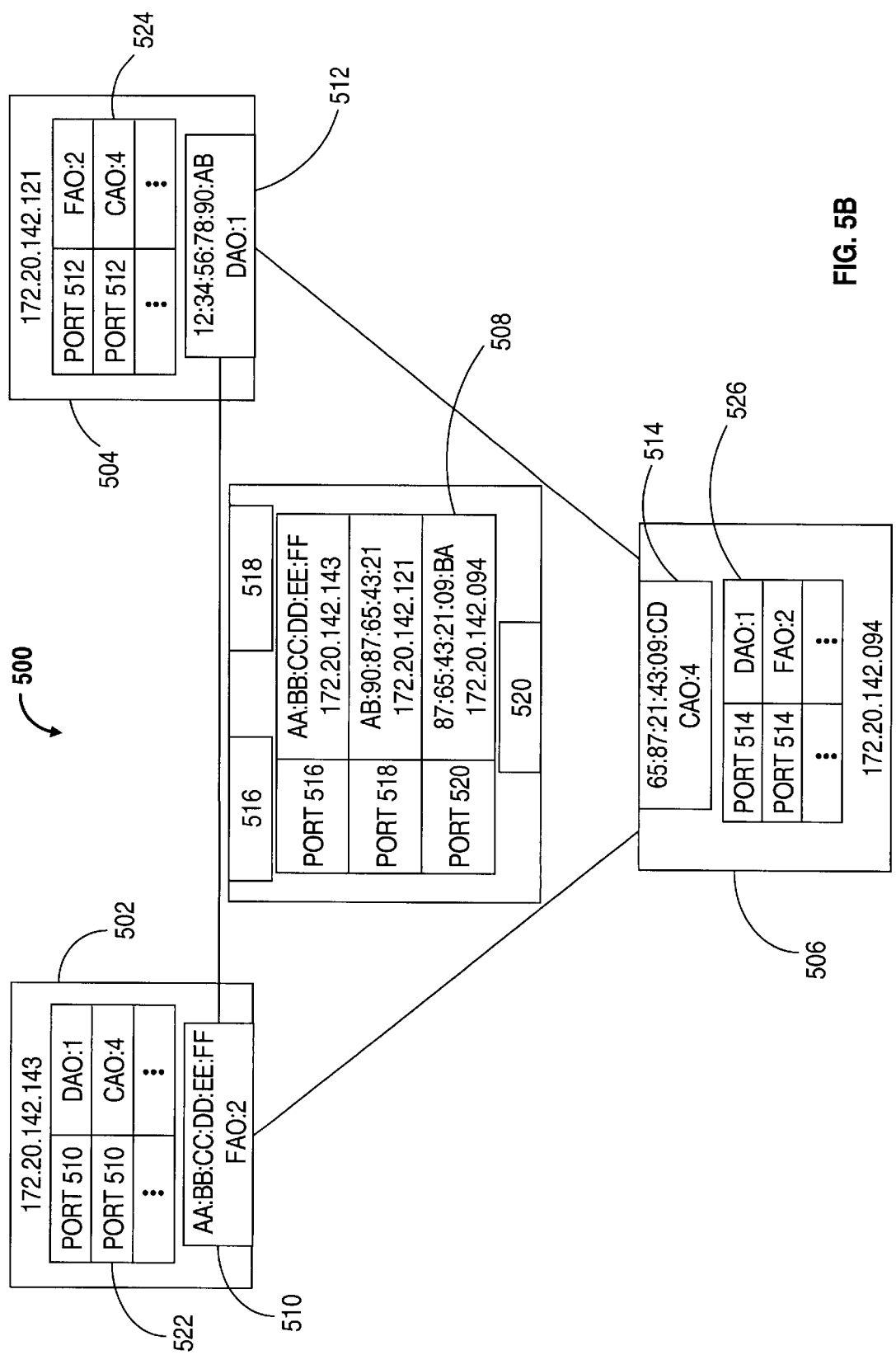
FIG. 5B is a block diagram illustrating certain a mechanism that can incorrectly identify a group of neighboring devices.

However, because device 508 does not support CDP, the CDP information that is recorded by devices 502, 504, 506 will indicate the actual physical links as shown in FIG. 5B, which is not the correct topology. As shown in FIG. 5B, devices 502, 504, 506 respectively include CDP records 522, 524, 526. Because device 508 does not support CDP, the information in CDP records 522, 524, 526 incorrectly indicates that devices 502, 504, 506 are neighboring devices.

In one embodiment, to determine actual neighboring devices, the discovery mechanism identifies device 508 as a potential problem device, and uses its MAC address information to identify what MAC address have been seen by each of its ports. The MAC address information of device 508 indicates that the MAC address of device 502 has been seen on port 516, the MAC address of device 504 has been seen on port 518, and the MAC address of device 506 has been seen on port 520. In addition, the discovery mechanism determines that the CDP information of device 502 indicates that port 510 is physically connected to two separate ports 512, 514, that the CDP information of device 504 indicates that port 512 is physically connected to two separate ports 510, 514, and that the CDP information of device 502 indicates that port 514 is physically connected to two separate ports 510, 512. However, a single port cannot be physically linked to two separate ports.

Based on this information, the discovery mechanism determines that, as illustrated in FIG. 5A, device 508 is linked to devices 502, 504, 506 on ports 516, 518, 520, respectively, and that the CDP information of devices 502, 504, 506 incorrectly identified such devices as neighboring devices.

5. BLACK CLOUD DEVICE DETECTION

In addition to the known devices, the discovery mechanism may also identify unidentifiable devices within the network.

In this context, an unidentifiable device ("black cloud device") is associated with an address within the set of network addresses but which was not identified as a known device. The discovery mechanism knows a black cloud device is present in the network, but cannot determine what it is. For example, a black cloud device may include a device that does not support SNMP or whose agent does not support the MIB information that is required for identifying the device's type.

In certain embodiments, the discovery mechanism may use the collected configuration information to infer the location of black cloud devices within the network topology. In one embodiment, if the discovery mechanism identifies three (3) or more devices that report multiple neighboring devices on the same port, the discovery mechanism infers that the devices actually are linked through a black cloud device.

Figure 6A:
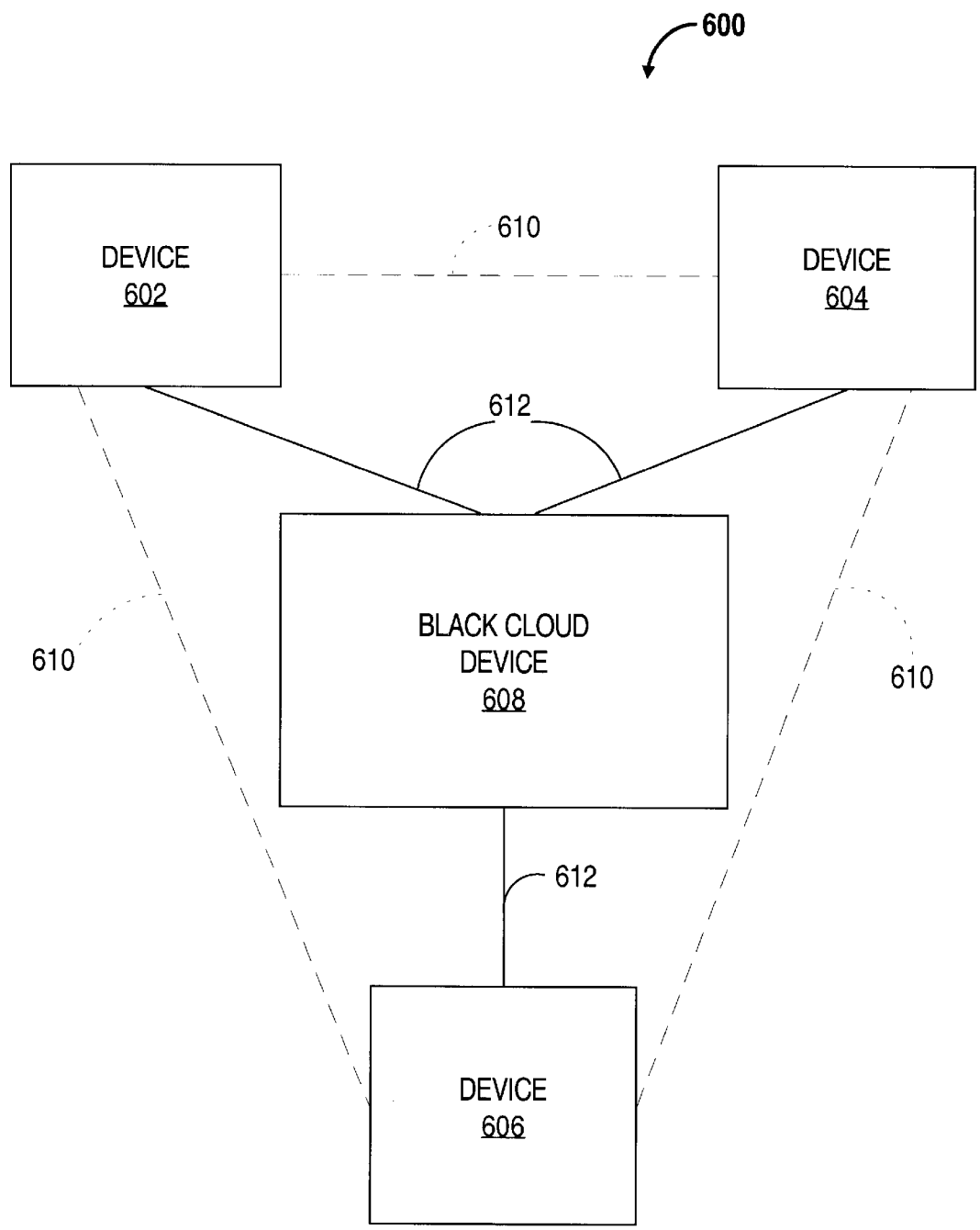
FIG. 6A is a block diagram illustrating a mechanism for identifying physical links to unknown ("black cloud") devices.

FIG. 6A includes three known devices 602, 604, 606 that support CDP, or for which connectivity has been successfully determined, and a black cloud device 608 that does not support CDP. Black cloud device 608 represents one or more devices that the discovery mechanism did not previously identify as known devices.

Since devices 602, 604, 606 are connected through black cloud device 608, their recorded CDP information will indicate that they are neighboring devices, as depicted by dashed lines 610. In addition, the recorded CDP information will indicate that a single port of device 602 is physically linked to both devices 604, 606, a single port of device 604 is linked to both devices 602, 606, and that a single port of device 606 is linked to both devices 602, 604. Because multiple devices cannot be linked to a single port, the discovery mechanism infers that known devices 602, 604, 606 are physically linked to black cloud device 608 and not to each other, as indicted by solid lines 612.

Figures 6B, 6C:
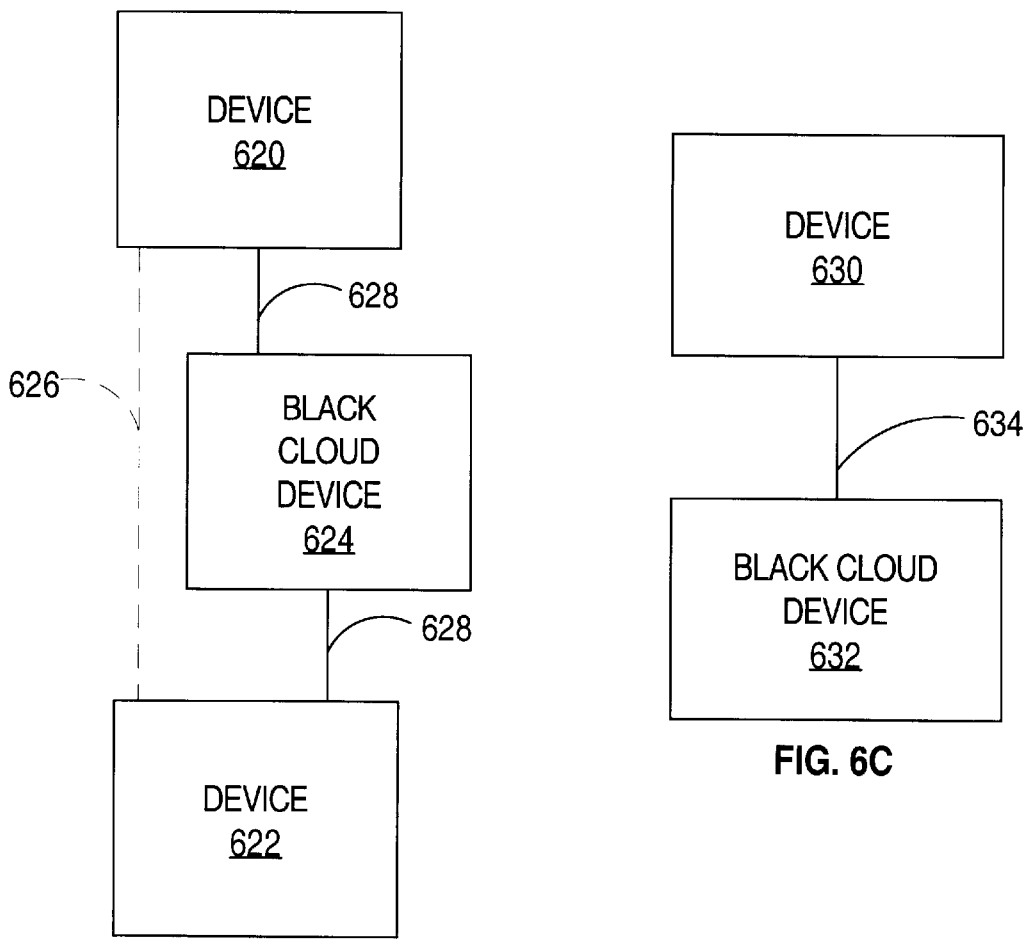
FIG. 6B is another block diagram illustrating a mechanism for identifying physical links to black cloud devices.
FIG. 6C is another block diagram illustrating a mechanism for identifying physical links to black cloud devices.

FIG. 6B illustrates another possible black cloud device configuration. In this example, known devices 620, 622, which support CDP, are physically linked through black cloud device 624. Because black cloud device 624 does not support CDP, the CDP information of known devices 620, 622 indicates that they are physically linked to one another, as depicted by dashed line 626. However, by detecting that devices 620, 622 both observe additional common MAC addresses on the same ports with which the devices observe each other, the discovery mechanism determines that known devices 620, 622 are linked to black cloud device 624, and not each other, as depicted by solid lines 628.

FIG. 6C illustrates another type of black cloud device configuration that may exist. In this example, known device 630, which supports CDP, is physically linked to black cloud device 632. Because black cloud device 632 does not support CDP, the CDP information associated with the port that actually links device 630 to black cloud device 632 indicates that no physical link exists. However, by determining that more than one MAC address is received by a port whose CDP information indicates that it is not physically linked to another discovered device, the discovery mechanism can determine that device 630 is physically linked to black cloud device 632 as depicted by solid lines 634. Thus, by identifying ports of known devices that do not appear to be linked to another discovered device, based on that device's CDP information, the discovery mechanism can resolve whether the ports are physically linked to a black cloud device, by determining whether more than one MAC address, which are not associated with discovered devices, are observed at each of the ports.

6. INTERNET DETECTION

In general, each routing device includes a plurality of different ports that are used to route message information. A routing table associated with the routing device indicates a particular routing location that is to be used for forwarding each message to the different destination entities.

When a message is received for an unknown entity, a default routing location is used to forward the received message. In one embodiment, the discovery mechanism compares the default routing location of each routing device with the set of network addresses that it initially received. The discovery mechanism determines whether any default routing location is outside the range of network addresses it received. If a default routing location is outside such range, then the discovery mechanism infers that the associated routing device is connected to an external network such as the Internet.

Thus, by identifying the device whose routing table includes a default routing location outside the chosen set of network addresses, the discovery mechanism can identify where the physical link to the Internet exists with the network topology. The Internet link may be represented in the network topology, which provides useful information to the network administrator.

7. IDENTIFYING STACKABLE DEVICES

Within a network certain devices may be physically stacked and logically coupled together in a stack. These devices, when stacked, operate as one addressable entity and are associated with one IP address. For example, the Model 1502 Microhub and Model 1503 Microhub, commercially available from Cisco Systems, Inc., are stackable network devices and operate as one entity when stacked.

In one embodiment, the discovery mechanism identifies known stackable devices. In certain embodiments, the discovery mechanism maintains a list of stackable devices. In response to identifying a possible stacked device, the discovery mechanism queries the known device to retrieve MIB information that indicates the particular type and number of stackable devices that are associated with the known device. Using the MIB information the discovery mechanism whether a particular known device is a stacked device and if so, the particular type and number of devices that make up the known device.

8. GENERATING PHYSICAL LINK INFORMATION

Figure 7:
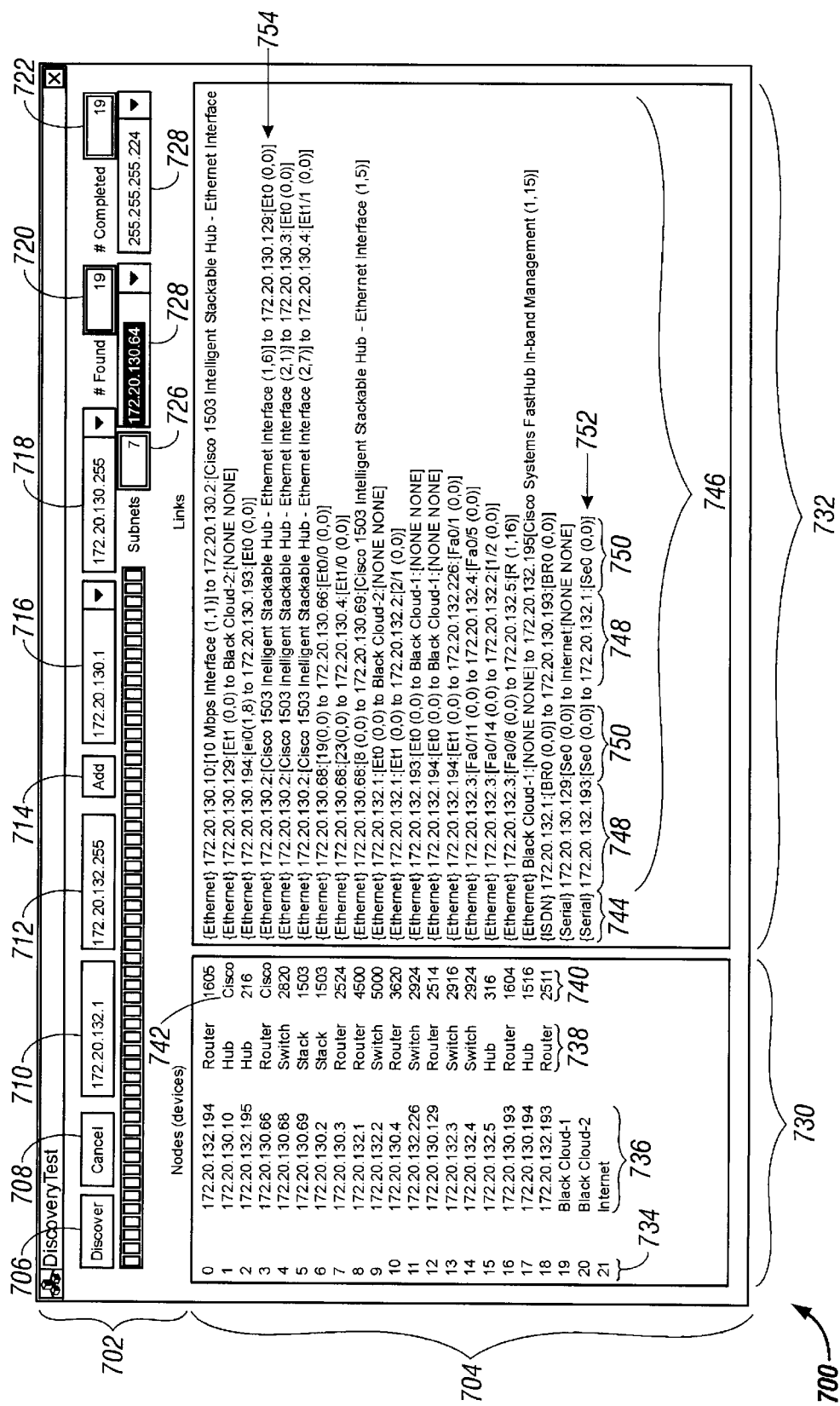
FIG. 7 illustrates a user interface window of a test program that shows values generated by execution of an embodiment.

FIG. 7 illustrates a user interface window 700 of a test program that illustrates data values generated by execution of an embodiment of the invention.

User interface window 700 includes user control section 702 and device display section 704. User control section 702 has a discover button 706, a cancel button 708, IP address range indicators 710, 712, add button 714, IP address entry dialogs 716, 718, device found indicator 720, device completed indicator 722, subnets found indicator 726 and subnet range dialog 728.

By selecting discover button 706 a user can initiate the discovery of devices with the selected set of network addresses. Cancel button 708 allows a user to halt or cancel the discovery mechanism after device discovery has begun.

IP address range boxes 710, 712 allow a user to enter, and the discovery mechanism to receive, an address range for discovering devices. The user may enter a starting IP address range and IP address range, respectively, in boxes 710, 712. Add button 714 allows a user to enter each address range into the system for defining the set of network addresses that are to be processed by the discovery mechanism.

IP address pull down menus 716 and 718 provide a pull down menu that depicts the starting and ending IP addresses for each range of IP addresses that have selected by the user.

Device found indicator 720 provides a running total of the number of known devices that have been identified within the selected set of network address. Device completed indicator 722 provides a running total of the number of known devices whose physical links have been determined. Subnets found indicator 726 indicates the IP address of one or more subnetworks that are discovered to be connected to the devices in the range indicated in box 710, 712. The subnet range dialog 728 indicates the subnet mask of the specified subnet, showing how many IP addresses that subnet occupies.

Device display section 704 includes a Layer 3 device description section 730 and a Layer 2 physical link section 732. Layer 3 device description section 730 includes device inventory counter 734, address identifier 736, known device type 738 and model identifier 740.

Device inventory counter 734 depicts the number of all devices, including black cloud devices and identified Internet location, that have been identified by the discovery mechanism. Address identifier 736 depicts the IP address of each known device that is discovered and a unique ID for each black cloud device that is identified and an Internet ID if the network is determined to be linked to the Internet.

Known device type 738 indicates the type of device that was discovered and model identifier 740 indicates the actual model number of the particular device type. As illustrated by generic model type 742, a generic description of the device's vendor may be displayed when a generic device type is identified.

Layer 2 physical link section 732 includes a link type descriptor section 744 and a link description section 746. The link type descriptor 744 indicates the type of link, such as an Ethernet, ISDN or Serial link, that has been established between each of the devices.

Link description section 746 includes IP address descriptors 748 and interface or port IDs 750. The IP address descriptor 748 indicates the IP address of two physically linked known devices. The interface or port IDs 750 indicate the device group and port that is used to physically link the two devices. For most devices, the device group will be set to "0". However, for stackable devices, the group represents the particular device unit in which the physical link is made.

For example, entry 752 indicates that a Serial link exits between port "0" of device unit "0" of a device with IP address "172.20.132.193" and port "0" of device unit "0" of a device with IP address "172.20.132.1". Alternatively, entry 754 indicates that an Ethernet link exits between port "6" of device unit "1" of a stackable device with IP address "172.20.130.2" and port "0" of device unit "0"of a device with IP address "172.20.130.129".

Using the Layer 3 device and Layer 2 physical link information, the discovery mechanism generates a topology of the network devices within the network of interest. The topology may be generated and stored in the form of a tree of data values that are stored in a storage device. Alternatively, the topology may be generated, stored, or displayed in graphical form.

Figure 8:
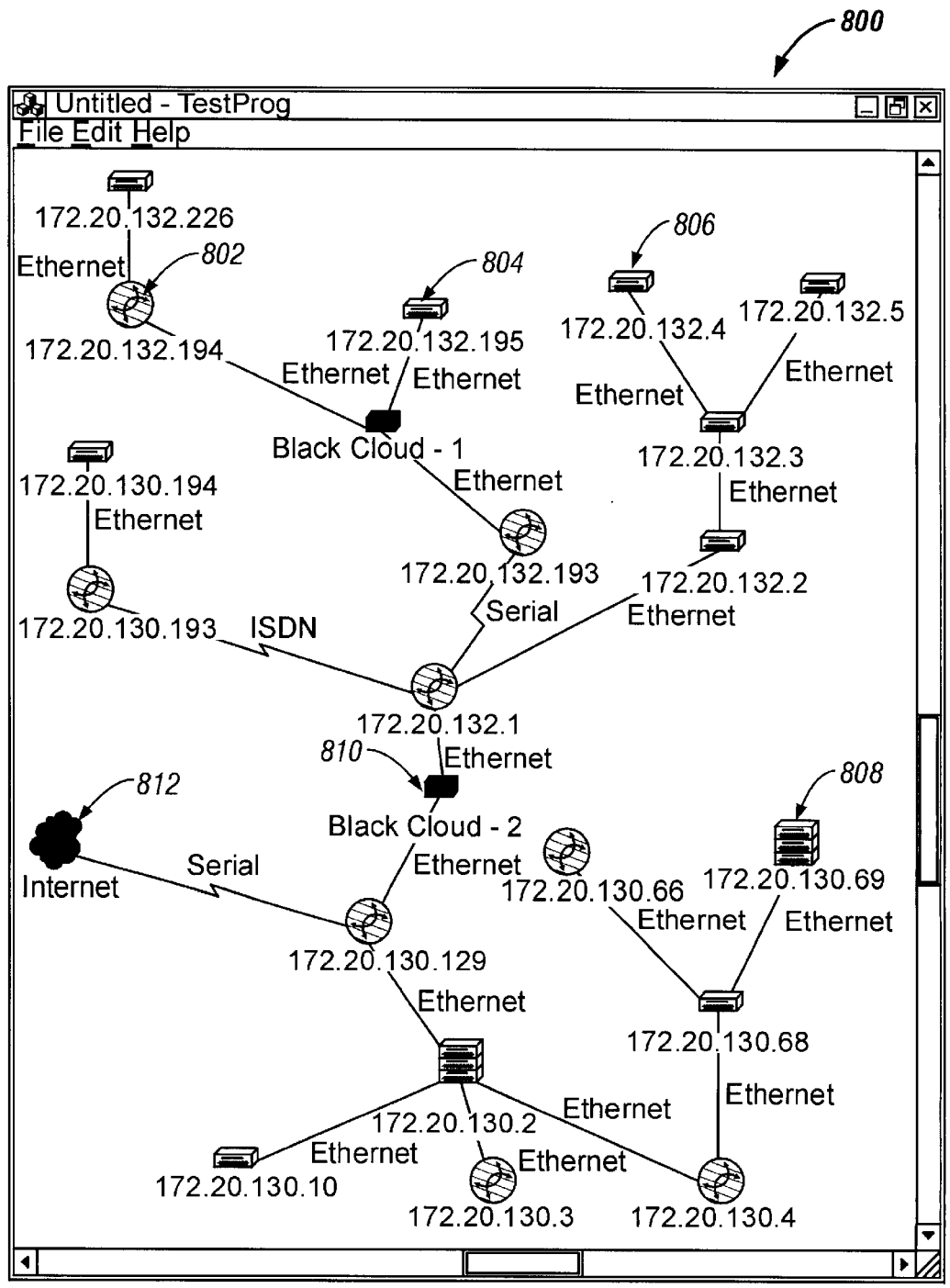
FIG. 8 illustrates an example of a topology that is based on the information depicted in FIG. 7.

FIG. 8 illustrates an example of a graphical topology 800 that is generated and displayed by the discovery mechanism. In this example, the topology 800 is based on the information depicted in FIG. 7.

Topology 800 includes several distinct symbols to represent different types of known devices, black cloud devices and Internet connections. For example, symbol 802 represents a router, symbol 804 represents a hub, symbol 806 represents a switch, symbol 808 represents a stacked hub, symbol 810 represents a black cloud device and symbol 812 represents an Internet connection.

In addition, the topology 800 may include a value of an IP address that is associated with each known device. In the example of FIG. 8, each IP address is displayed immediately below a symbol corresponding to a device. Lines in the graphical display represent physical links between devices. Each line may be labeled, as in this example, with the type of link such as Ethernet, Serial, ISDN, etc.

SEQUENCE FOR GENERATING A NETWORK TOPOLOGY

Figure 9:
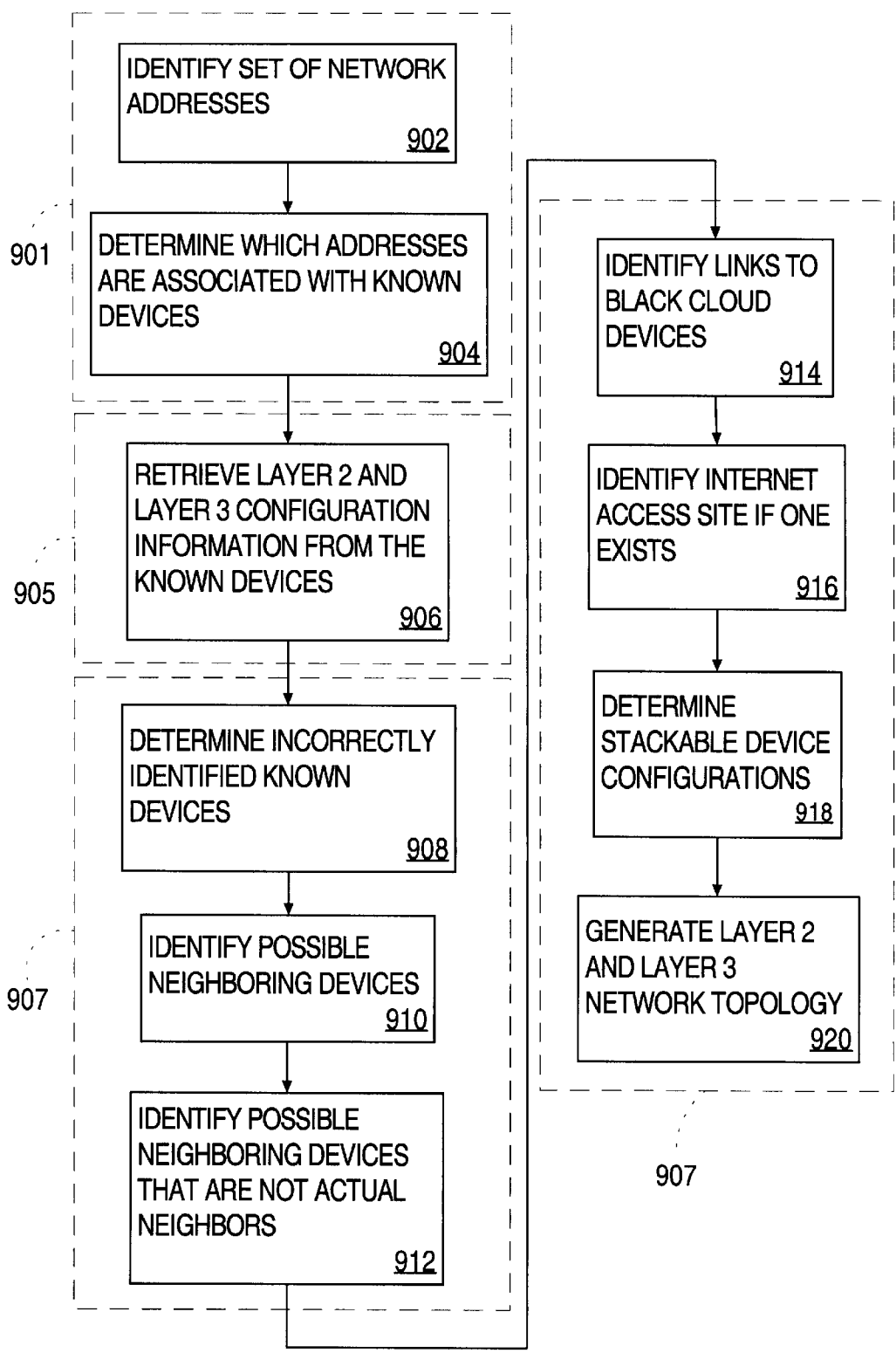
FIG. 9 is a flow diagram that illustrates steps involved in generating a topology of network devices in a network.

FIG. 9 is a flow diagram that illustrates a process of generating a topology of network devices in a network. For purposes of clarity, the steps of FIG. 9 will be explained with reference to FIG. 7 and FIG. 8; however, the process of FIG. 9 is not limited to this context.

At block 901, a device search phase is performed. Generally, the device search involves determining a set of network addresses to be searched and identifying devices that are associated with addresses with the set of network addresses.

To perform the device search phase, at block 902 a set of network addresses are determined, which addresses define a network for which a topology is to be generated. For example, as depicted in FIG. 7, the discovery mechanism may receive, or a user may enter, one or more IP address ranges that define a set of network addresses for which a topology is to be generated.

At block 904, the process determines which addresses within the set of network addresses are associated with a device. In one embodiment, the discovery mechanism divides the set of addresses into multiple subsets, assigns each subset to a separate thread or process, and executes the threads or processes in parallel. Each thread or process then determines whether a device is associated with each address it has been assigned. If so, the thread then attempts to determine the device's type. If the device type can be determined, the device is a known device.

At block 905, an information-gathering phase is performed in which configuration information is retrieved from the group of known devices.

In the information-gathering phase, at block 906 the process collects Layer 2 and Layer 3 configuration information from the group of known devices. The process may collect both MAC address information and proprietary discovery protocol information, such as CDP information, from the known devices. The process may induce message traffic in the network by repeatedly sending messages to the set of network addresses.

At block 907, a link-processing phase is performed to identify the physical connectivity of the devices that are associated with the network.

In the link processing phase, at block 908, the process discards any information that as been collected for incorrectly identified known devices. For example, the process identifies those known devices that are associated with a broadcast address, associated with an address that has been assigned to the network itself, or associated with multiple IP addresses thus causing duplicate configuration information has been collected for the known device.

At block 910, the process identifies possible neighboring devices. In one embodiment, the process uses proprietary discovery protocol information that was collected during the information-gathering phase to identify possible neighboring devices.

At block 912, the process identifies determines which of the possible neighboring devices are not actual neighbors. In one embodiment, the process identifies a set of potential problem devices, which may include known hubs or repeaters that do not support the proprietary discovery protocol. The process then determines what MAC addresses have been seen by the potential problem devices and whether the known devices associated with the MAC addresses indicate that they have multiple neighboring devices from a single physical link. Based on this information, the process cannot only identify the possible neighboring devices that are not actual neighboring devices but also physical links that exist between known devices but are not indicated by the proprietary discovery protocol information.

At block 914, black cloud devices are identified. As previously indicated, by observing what MAC addresses are observed by each port of the known devices, the process can identify physical links that are made to groups of one or more unknown devices.

At block 916, configuration information associated with routers is processed to identify the routing table that has a default address outside the set of network addresses. The interface or port that is associated with the identified routing table is tagged as a connection, gateway or interface to an external network such as the Internet.

At step 918, known devices that are stackable are identified. Their collected configuration information is processed to determine whether they are a stacked device, and if so, the number of devices that have been stacked together and the model of each device.

At step 920, a topology is generated based on the Layer 2 and Layer 3 information that was collected and processed. For example, as illustrated in FIG. 8, a display may be generated that graphically depicts the type of devices and the physical links that connect neighboring devices within the network.

Hardware Overview

Figure 10:
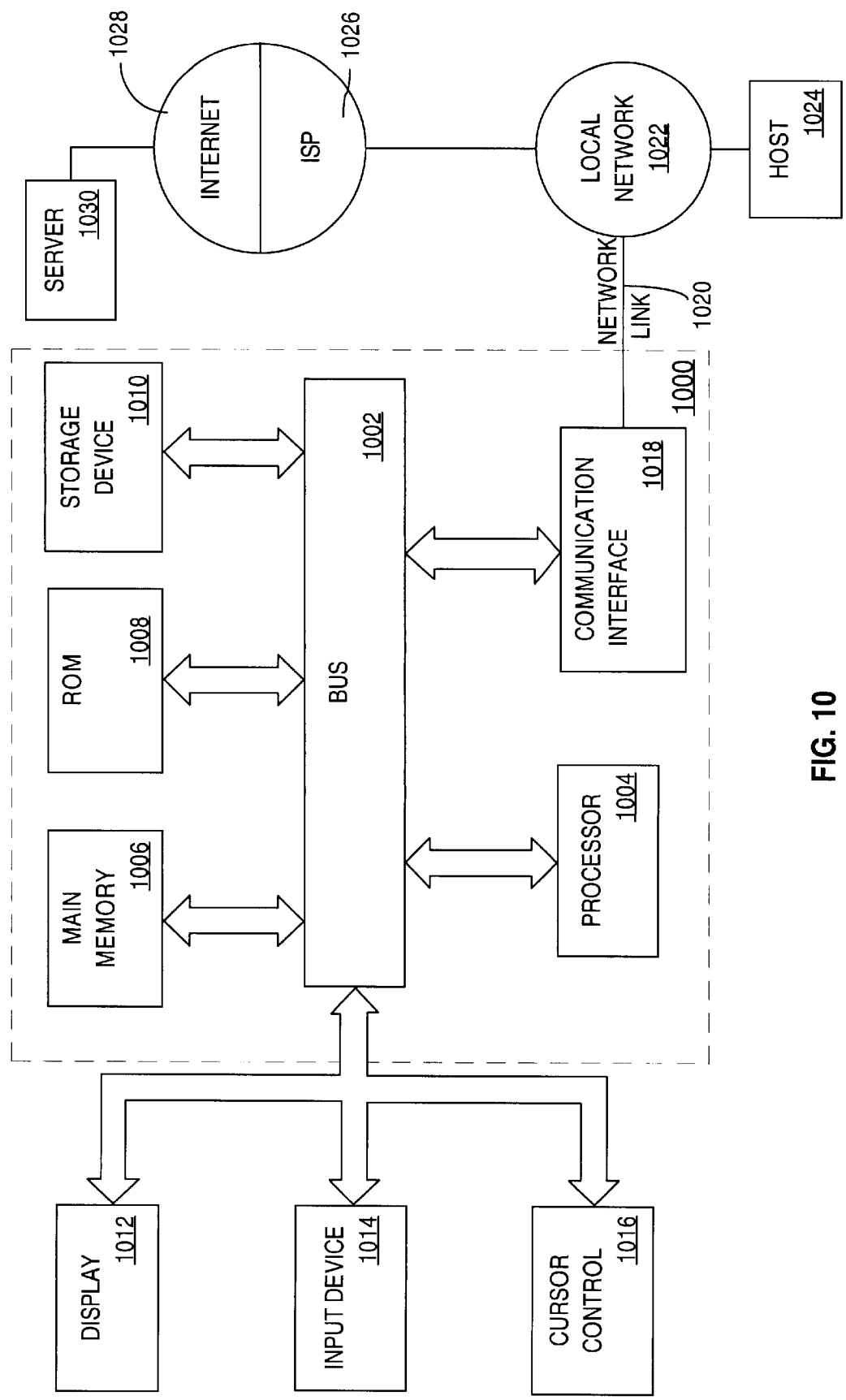
FIG. 10 is a block diagram of a computer system hardware arrangement that can be used to implement aspects of the invention.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for determining a physical topology of network devices in a network. According to one embodiment of the invention, determining a physical topology of network devices in a network is carried out by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for determining a physical topology of network devices in a network as described herein.

The received code may be executed by processor 1004 as it is received, and/or stored in storage device 1010, or other non-volatile storage for later execution. In this manner, computer system 1000 may obtain application code in the form of a carrier wave.

Alternatives, Extensions

The discovery mechanism that is described herein allows operators to select a set of network addresses for generating a physical topology of network devices in a network. In generating the topology, the discovery mechanism collects both Layer 2 and Layer 3 information about the devices that are associated with addresses with the selected set of network addresses. Thus, a network administrator is provided with up-to-date network device information about the devices in the network and how the devices are physically connected.

The discovery mechanism may be used to discover devices remotely from across a network. The discovery mechanism may be executed in one location to discover a network in another location. For example, a portable computer or remote computer may open an Internet connection to the managed network and execute the discovery mechanism. This may be implemented by configuring a firewall of the managed network to allow ICMP and SNMP traffic from the remote computer to enter the managed network.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. For example, the discovery mechanism has been described in reference to certain devices of Cisco Systems, Inc., but embodiments of the invention are not limited to use with any particular devices. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for determining a physical topology of a network, the method comprising the computer-implemented steps of:

determining possible neighboring devices for each device in a plurality of devices that are located in the network;

creating and storing information representing the plurality of devices;

determining true neighboring devices based on the plurality of devices and the possible neighboring devices;

creating and storing information representing the true neighboring devices; and creating and storing information that represents the physical topology of the network based on the information representing the plurality of devices and the information representing the true neighboring devices.

2. A method as recited in claim 1, further comprising the step of discovering, prior to determining the possible neighboring devices, the plurality of devices based on each address within a set of network addresses.

3. A method as recited in claim 1, further comprising the step of creating information representing the plurality of devices;

wherein the step of determining the true neighboring devices includes the step of processing the information representing the plurality of devices to eliminate, from among the possible neighboring devices, each device that is not actually a neighbor of the plurality of devices to create information representing the true neighboring devices; and wherein the step of creating and storing information that represents the physical topology of the network includes the step of creating and storing information that represents the physical topology of the network based on the information representing the plurality of devices and the information representing the true neighboring devices.

4. A method as recited in claim 1, further comprising the step of creating information representing the plurality of devices;

wherein the step of determining the true neighboring devices includes the step of processing the information representing the plurality of devices to eliminate, from among the possible neighboring devices, each device that is not actually a neighbor of the plurality of devices to create information representing the true neighboring devices and each link between them, and wherein the step of creating and storing information that represents the physical topology of the network includes the step of creating and storing information that represents the physical topology of the network based on the information representing the plurality of devices, the information representing the true neighboring devices, and each link.

5. A method as recited in claim 1, wherein the step of determining possible neighboring devices includes the step of sending information requests to collect Layer 2 and Layer 3 configuration information from the plurality of devices.

6. A method as recited in claim 5:
wherein the step of sending the information requests to collect Layer 2 and Layer 3 configuration information includes the step of retrieving routing table information from devices within the plurality of devices that are of type router, wherein the routing table information identifies a port associated with a default routing address for each router type device; and
further comprising the step of detecting an Internet link to the network by identifying a router type device whose default routing address is outside a set of network address.

7. A method as recited in claim 5, wherein the step of sending the information requests to collect Layer 2 and Layer 3 configuration information includes the steps of:
identifying devices within the plurality of devices that support Cisco Discovery Protocol (CDP); and
retrieving CDP information from devices within the plurality of devices that support CDP; and
wherein the step of determining possible neighboring devices includes the step of determining possible neighboring devices based on the CDP information.

8. A method as recited in claim 1, further comprising the step of receiving one or more ranges of IP addresses, wherein the one or more ranges of IP addresses are associated with IP addresses that correspond to one or more local area networks.

9. A method as recited in claim 1, further comprising the steps of:
discovering the plurality of devices based on each address within a set of network addresses by attempting to contact a device at each address within the set of network addresses;
in response to contacting a particular device at a particular address, contacting a Simple Network Management Protocol (SNMP) agent in the particular device to receive a device type value is associated with the particular device;
determining service layers for which the device operates when the device is not of a known device type; and
based on the service layers that are determined, inferring that the device is of a particular device type associated with the service layers.

10. A method as recited in claim 1, wherein the step of determining the true neighboring devices comprises the steps of:
identifying devices within the plurality of devices that are not an actual device associated with a set of network addresses; and
bypassing the devices within the plurality of devices that are not actual devices associated with the set of network addresses.

11. A method as recited in claim 1, wherein the step of determining the true neighboring devices further comprises the steps of:
identifying an apparent physical link between a first port of a first potentially neighboring device and a second port of a second potentially neighboring device, wherein a first Media Access Control (MAC) address associated with the first port is observed at the second port and a second MAC address associated with the second port is observed at the first port;
determining that a common MAC address is observed by both the first port and the second port; and
based on the common MAC address, determining that the first port of the first potentially neighboring device and the second port of the second potentially neighboring device are actually physically linked to one or more unidentifiable devices that are part of the network but are not included among the plurality of devices.

12. A method as recited in claim 1, wherein the step of determining the true neighboring devices further comprises the steps of:
identifying a device within the plurality of devices that includes a port that observes more than one MAC address but has no neighboring device; and
in response to identifying the device, determining that the port is physically linked to one or more unidentifiable devices that are part of the network but not included among the plurality of devices.

13. A computer-readable medium carrying one or more sequences of instructions for determining a physical topology of a network, wherein execution of the one or more sequences of instructions by one or more processors causes the one or more processors to perform the steps of:
determining possible neighboring devices for each device in a plurality of devices that are located in the network;
creating and storing information representing the plurality of devices;
determining true neighboring devices based on the plurality of devices and the possible neighboring devices;
creating and storing information representing the true neighboring devices; and
creating and storing information that represents the physical topology of the network based on the information representing the plurality of devices and the information representing the true neighboring devices.

14. A computer-readable medium as recited in claim 13, further comprising instructions which, when executed by the one or more processors, cause the one or more processors to carry out the step of discovering, prior to the step of determining the possible neighboring devices, the plurality of devices based on each address within a set of network addresses.

15. A computer-readable medium as recited in claim 13, further comprising instructions which, when executed by the one or more processors, cause the one or more processors to carry out the step of creating information representing the plurality of devices;
wherein the instructions for determining the true neighboring devices further comprise instructions which, when executed by one or more processors, cause the one or more processors to carry out the step of processing the information representing the plurality of devices to eliminate, from among the possible neighboring devices, each device that is not actually a neighbor of the plurality of devices to create information representing the true neighboring devices; and
wherein the instructions for creating and storing information that represents the physical topology of the network further comprise instructions which, when executed by one or more processors, cause the one or more processors to carry out the steps of creating and storing information that represents the physical topology of the network based on the information representing the plurality of devices and the information representing the true neighboring devices.

16. A computer-readable medium as recited in claim 13, further comprising instructions which, when executed by the one or more processors, cause the one or more processors to carry out the step of creating information representing the plurality of devices;

wherein the instructions for determining the true neighboring devices further comprise instructions which, when executed by one or more processors, cause the one or more processors to carry out the steps of includes the step of processing the information representing the plurality of devices to eliminate, from among the possible neighboring devices, each device that is not actually a neighbor of the plurality of devices to create information representing the true neighboring devices and each link between them; and wherein instructions for creating and storing information that represents the physical topology of the network further comprise instructions which, when executed by one or more processors, cause the one or more processors to carry out the steps of creating and storing information that represents the physical topology of the network based on the information representing the plurality of devices, the information representing the true neighboring devices, and each link.

17. A computer-readable medium as recited in claim 13, wherein the instructions for determining possible neighboring devices further comprise instructions which, when executed by one or more processors, cause the one or more processors to carry out the step of sending information requests to collect Layer 2 and Layer 3 configuration information from the plurality of devices.

18. A computer-readable medium as recited in claim 17:

wherein the instructions for sending information requests to collect Layer 2 and Layer 3 configuration information further comprise instructions which, when executed by one or more processors, cause the one or more processors to carry out the step of retrieving routing table information from devices within the plurality of devices that are of type router, wherein the routing table information identifies a port associated with a default routing address for each router type device; and further comprising instructions which, when executed by the one or more processors, cause the one or more processors to carry out the step of detecting an Internet link to the network by identifying a router type device whose default routing address is outside a set of network address.

19. A computer-readable medium as recited in claim 17, wherein the instructions for sending information requests to collect Layer 2 and Layer 3 configuration information further comprise instructions which, when executed by one or more processors, cause the one or more processors to carry out the steps of:

identifying devices within the plurality of devices that support Cisco Discovery Protocol (CDP); and retrieving CDP information from devices within the plurality of devices that support CDP; and wherein the instructions for determining possible neighboring devices further comprise instructions which, when executed by one or more processors, cause the one or more processors to carry out the step of determining possible neighboring devices based on the CDP information.

20. A computer-readable medium as recited in claim 13, further comprising instructions which, when executed by the one or more processors, cause the one or more processors to carry out the step of receiving one or more ranges of IP addresses, wherein the one or more ranges of IP addresses are associated with IP addresses that correspond to one or more local area networks.

21. A computer-readable medium as recited in claim 13, further comprising instructions which, when executed by the one or more processors, cause the one or more processors to carry out the steps of:

discovering the plurality of devices based on each address within a set of network addresses by attempting to contact a device at each address within the set of network addresses;

in response to contacting a particular device at a particular address, contacting a Simple Network Management Protocol (SNMP) agent in the particular device to receive a device type value is associated with the particular device;

determining service layers for which the device operates when the device is not of a known device type; and based on the service layers that are determined, inferring that the device is of a particular device type associated with the service layers.

22. A computer-readable medium as recited in claim 13, wherein the instructions for determining the true neighboring devices further comprise instructions which, when executed by the one or more processors, cause the one or more processors to carry out the steps of:

identifying devices within the plurality of devices that are not an actual device associated with a set of network addresses; and bypassing the devices within the plurality of devices that are not actual devices associated with the set of network addresses.

23. A computer-readable medium as recited in claim 13, wherein the instructions for determining the true neighboring devices further comprise instructions which, when executed by one or more processors, cause the one or more processors to carry out the steps of:

identifying an apparent physical link between a first port of a first potentially neighboring device and a second port of a second potentially neighboring device, wherein a first Media Access Control (MAC) address associated with the first port is observed at the second port and a second MAC address associated with the second port is observed at the first port;

determining that a common MAC address is observed by both the first port and the second port; and based on the common MAC address, determining that the first port of the first potentially neighboring device and the second port of the second potentially neighboring device are actually physically linked to one or more unidentifiable devices that are part of the network but are not included among the plurality of devices.

24. A computer-readable medium as recited in claim 13, wherein the instructions for determining the true neighboring devices further comprise instructions which, when executed by one or more processors, cause the one or more processors to carry out the steps of:

identifying a device within the plurality of devices that includes a port that observes more than one MAC address but has no neighboring device; and in response to identifying the device, determining that the port is physically linked to one or more unidentifiable devices that are part of the network but not included among the plurality of devices.

25. An apparatus for determining a physical topology of a network, the apparatus comprising:

means for determining possible neighboring devices for each device in a plurality of devices that are located in the network;

means for creating and storing information representing the plurality of devices;

means for determining true neighboring devices based on the plurality of devices and the possible neighboring devices;

means for creating and storing information representing the true neighboring devices; and means for creating and storing information that represents the physical topology of the network based on the information representing the plurality of devices and the information representing the neighboring devices.

26. An apparatus as recited in claim 25, further comprising means for discovering, prior to determining the possible neighboring devices, the plurality of devices based on each address within a set of network addresses.

27. An apparatus as recited in claim 25, further comprising means for creating information representing the plurality of devices;

wherein the means for determining the true neighboring devices includes means for processing the information representing the plurality of devices to eliminate, from among the possible neighboring devices, each device that is not actually a neighbor of the plurality of devices to create information representing the true neighboring devices; and wherein the means for creating and storing information that represents the physical topology of the network includes means for creating and storing information that represents the physical topology of the network based on the information representing the plurality of devices and the information representing the true neighboring devices.

28. An apparatus as recited in claim 25, further comprising means for creating information representing the plurality of devices;

wherein the means for determining the true neighboring devices includes means for processing the information representing the plurality of devices to eliminate, from among the possible neighboring devices, each device that is not actually a neighbor of the plurality of devices to create information representing the true neighboring devices and each link between them; and wherein the means for creating and storing information that represents the physical topology of the network includes means for creating and storing information that represents the physical topology of the network based on the information representing the plurality of devices, the information representing the true neighboring devices, and each link.

29. An apparatus as recited in claim 25, wherein the means for determining possible neighboring devices includes means for sending information requests to collect Layer 2 and Layer 3 configuration information from the plurality of devices.

30. An apparatus as recited in claim 29:

wherein the means for sending information requests to collect Layer 2 and Layer 3 configuration information includes means for retrieving routing table information from devices within the plurality of devices that are of type router, wherein the routing table information identifies a port associated with a default routing address for each router type device; and further comprising means for detecting an Internet link to the network by identifying a router type device whose default routing address is outside a set of network address.

31. An apparatus as recited in claim 29, wherein the means for sending information requests to collect Layer 2 and Layer 3 configuration information comprises:

means for identifying devices within the plurality of devices that support Cisco Discovery Protocol (CDP); and means for retrieving CDP information from devices within the plurality of devices that support CDP; and wherein the means for determining possible neighboring devices includes means for determining possible neighboring devices based on the CDP information.

32. An apparatus as recited in claim 25, further comprising means for receiving one or more ranges of IP addresses, wherein the one or more ranges of IP addresses are associated with IP addresses that correspond to one or more local area networks.

33. An apparatus as recited in claim 25, further comprising:

means for discovering the plurality of devices based on each address within a set of network addresses by attempting to contact a device at each address within the set of network addresses;

means for, in response to contacting a particular device at a particular address, contacting a Simple Network Management Protocol (SNMP) agent in the particular device to receive a device type value is associated with the particular device;

means for determining service layers for which the device operates when the device is not of a known device type; and means for, based on the service layers that are determined, inferring that the device is of a particular device type associated with the service layers.

34. An apparatus as recited in claim 25, wherein the means for determining the true neighboring devices comprises:

means for identifying devices within the plurality of devices that are not an actual device associated with a set of network addresses; and means for bypassing the devices within the plurality of devices that are not actual devices associated with the set of network addresses.

35. An apparatus as recited in claim 25, wherein the means for determining the true neighboring devices further comprises:

means for identifying an apparent physical link between a first port of a first potentially neighboring device and a second port of a second potentially neighboring device, wherein a first Media Access Control (MAC) address associated with the first port is observed at the second port and a second MAC address associated with the second port is observed at the first port;

means for determining that a common MAC address is observed by both the first port and the second port; and means for, based on the common MAC address, determining that the first port of the first potentially neighboring device and the second port of the second potentially neighboring device are actually physically linked to one or more unidentifiable devices that are part of the network but are not included among the plurality of devices.

36. An apparatus as recited in claim 25, wherein the means for determining the true neighboring devices further comprises:

means for identifying a device within the plurality of devices that includes a port that observes more than one MAC address but has no neighboring device; and means for in response to identifying the device, determining that the port is physically linked to one or more unidentifiable devices that are part of the network but not included among the plurality of devices.

37. A computer apparatus comprising:

a processor; and a memory coupled to the processor, the memory containing one or more sequences of instructions for determining a physical topology of a network, wherein execution of the one or more sequences of instructions by the processor causes the processor to perform the steps of:
- determining possible neighboring devices for each device in a plurality of devices that are located in the network;
- creating and storing information representing the plurality of devices;
- determining true neighboring devices based on the plurality of devices and the possible neighboring devices;
- creating and storing information representing the true neighboring devices; and
- creating and storing information that represents the physical topology of the network based on the information representing the plurality of devices and the information representing the true neighboring devices.

38. A computer apparatus as recited in claim 37, wherein the memory further contains one or more sequences of instructions which, when executed by the processor, cause the processor to carry out the step of discovering, prior to the step of determining the possible neighboring devices, the plurality of devices based on each address within a set of network addresses.

39. A computer apparatus as recited in claim 37, wherein the memory further contains one or more sequences of instructions which, when executed by the processor, cause the processor to carry out the step of creating information representing the plurality of devices;
- wherein the instructions for determining the true neighboring devices further comprise instructions which, when executed by the processor, cause the processor to carry out the step of processing the information representing the plurality of devices to eliminate, from among the possible neighboring devices, each device that is not actually a neighbor of the plurality of devices to create information representing the true neighboring devices; and
- wherein the instructions for creating and storing information that represents the physical topology of the network further comprise instructions which, when executed by the processor, cause the processor to carry out the steps of creating and storing information that represents the physical topology of the network based on the information representing the plurality of devices and the information representing the true neighboring devices.

40. A computer apparatus as recited in claim 37, wherein the memory further contains one or more sequences of instructions which, when executed by the processor, cause the processor to carry out the step of creating information representing the plurality of devices;
- wherein the instructions for determining the true neighboring devices further comprise instructions which, when executed by the processor, cause the processor to carry out the steps of processing the information representing the plurality of devices to eliminate, from among the possible neighboring devices, each device that is not actually a neighbor of the plurality of devices to create information representing the true neighboring devices and each link between them; and
- wherein the instructions for creating and storing information that represents the physical topology of the network further comprise instructions which, when executed by the processor, cause the processor to carry out the steps of creating and storing information that represents the physical topology of the network based on the information representing the plurality of devices, the information representing the true neighboring devices, and each link.

41. A computer apparatus as recited in claim 37, wherein the instructions for determining possible neighboring devices further comprise instructions which, when executed by the processor, cause the processor to carry out the step of sending information requests to collect Layer 2 and Layer 3 configuration information from the plurality of devices.

42. A computer apparatus as recited in claim 41:
- wherein the instructions for sending information requests to collect Layer 2 and Layer 3 configuration information further comprise instructions which, when executed by the processor, cause the processor to carry out the step of retrieving routing table information from devices within the plurality of devices that are of type router, wherein the routing table information identifies a port associated with a default routing address for each router type device; and
- wherein the memory further contains one or more sequences of instructions which, when executed by the processor, cause the processor to carry out the step of detecting an Internet link to the network by identifying a router type device whose default routing address is outside a set of network address.

43. A computer apparatus as recited in claim 41, wherein the instructions for sending information requests to collect Layer 2 and Layer 3 configuration information further comprise instructions which, when executed by the processor, cause the processor to carry out the steps of:
- identifying devices within the plurality of devices that support Cisco Discovery Protocol (CDP); and
- retrieving CDP information from devices within the plurality of devices that support CDP; and
- wherein the instructions for determining possible neighboring devices further comprise instructions which, when executed by the processor, cause the processor to carry out the step of determining possible neighboring devices includes the step of determining possible neighboring devices based on the CDP information.

44. A computer apparatus as recited in claim 37, wherein the memory further contains one or more sequences of instructions which, when executed by the processor, cause the processor to carry out the step of receiving one or more ranges of IP addresses, wherein the one or more ranges of IP addresses are associated with IP addresses that correspond to one or more local area networks.

45. A computer apparatus as recited in claim 37, wherein the memory further contains one or more sequences of instructions which, when executed by the processor, cause the processor to carry out the steps of:
- discovering the plurality of devices based on each address within a set of network addresses by attempting to contact a device at each address within the set of network addresses;

in response to contacting a particular device at a particular address, contacting a Simple Network Management Protocol (SNMP) agent in the particular device to receive a device type value is associated with the particular device;

determining service layers for which the device operates when the device is not of a known device type; and based on the service layers that are determined, inferring that the device is of a particular device type associated with the service layers.

46. A computer apparatus as recited in claim 37, wherein the instructions for determining the true neighboring devices further comprise instructions which, when executed by the processor, cause the processor to carry out the steps of:

identifying devices within the plurality of devices that are not an actual device associated with a set of network addresses; and bypassing the devices within the plurality of devices that are not actual devices associated with the set of network addresses.

47. A computer apparatus as recited in claim 37, wherein the instructions for determining the true neighboring devices further comprise instructions which, when executed by the processor, cause the processor to carry out the steps of:

identifying an apparent physical link between a first port of a first potentially neighboring device and a second port of a second potentially neighboring device, wherein a first Media Access Control (MAC) address associated with the first port is observed at the second port and a second MAC address associated with the second port is observed at the first port;

determining that a common MAC address is observed by both the first port and the second port; and based on the common MAC address, determining that the first port of the first potentially neighboring device and the second port of the second potentially neighboring device are actually physically linked to one or more unidentifiable devices that are part of the network but are not included among the plurality of devices.

48. A computer apparatus as recited in claim 37, wherein the instructions for determining the true neighboring devices further comprise instructions which, when executed by the processor, cause the processor to carry out the steps of:

identifying a device within the plurality of devices that includes a port that observes more than one MAC address but has no neighboring device; and in response to identifying the device, determining that the port is physically linked to one or more unidentifiable devices that are part of the network but not included among the plurality of devices.

* * * * *